(12) United States Patent
Yamamoto et al.

(10) Patent No.: US 7,161,696 B2
(45) Date of Patent: Jan. 9, 2007

(54) INFORMATION PROCESSING APPARATUS, PRINT TIME INFORMING METHOD, AND COMPUTER-READABLE MEMORY MEDIUM STORING PROGRAM THEREIN

(75) Inventors: Kosuke Yamamoto, Kanagawa (JP); Eiji Hayashi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 977 days.

(21) Appl. No.: 09/916,433

(22) Filed: Jul. 30, 2001

(65) Prior Publication Data
US 2002/0054333 A1 May 9, 2002

(30) Foreign Application Priority Data

Jul. 31, 2000 (JP) .............................. 2000/231125
Dec. 27, 2000 (JP) .............................. 2000/398978

(51) Int. Cl.
*G06F 15/00* (2006.01)
(52) U.S. Cl. .................. 358/1.15; 358/1.13; 358/1.9; 399/43
(58) Field of Classification Search .............. 358/1.15, 358/1.9, 1.13; 399/43
See application file for complete search history.

(56) References Cited

U.S. PATENT DOCUMENTS

| | | | | |
|---|---|---|---|---|
| 5,579,447 A * | 11/1996 | Salgado | ...................... | 358/1.9 |
| 5,727,135 A * | 3/1998 | Webb et al. | ............... | 358/1.14 |
| 5,913,018 A * | 6/1999 | Sela | ......................... | 358/1.17 |
| 6,058,277 A * | 5/2000 | Streefkerk et al. | ........... | 399/81 |
| 6,519,049 B1* | 2/2003 | Nagasaka | .................. | 358/1.15 |
| 6,661,530 B1* | 12/2003 | Munetomo et al. | ........ | 358/1.15 |
| 6,678,068 B1* | 1/2004 | Richter et al. | ............. | 358/1.15 |
| 6,816,270 B1* | 11/2004 | Cooper et al. | ............. | 358/1.13 |
| 6,847,466 B1* | 1/2005 | Gazdik et al. | ............ | 358/1.15 |
| 6,891,632 B1* | 5/2005 | Schwartz | ................... | 358/1.15 |

\* cited by examiner

*Primary Examiner*—Twyler Lamb
*Assistant Examiner*—Mark R. Milia
(74) *Attorney, Agent, or Firm*—Fitzpatrick, Cella, Harper & Scinto

(57) ABSTRACT

An object of the invention is to enable the user to judge whether the print is executed or not by informing the user of a print time which is required for a printing process before starting the printing. The print time which is required for the printing process is estimated before starting the printing process on the basis of draw information based on a print document that is formed by an application and print set information at the time of executing the printing process of the print data.

21 Claims, 19 Drawing Sheets

FIG. 8

| OBJECT ID | STANDARD | PHOTO | COLOR-PREFERENTIAL | BRIGHTNESS-PREFERENTIAL | MONOCHROME TEXT | ... |
|---|---|---|---|---|---|---|
| 1 | 40 | 60 | 28 | 25 | 50 | ... |
| 2 | 10 | 25 | 60 | 30 | 45 | ... |
| 3 | 20 | 20 | 25 | 70 | 35 | ... |
| 4 | 70 | 50 | 40 | 36 | 22 | ... |
| 5 | 28 | 27 | 64 | 42 | 28 | ... |
| 6 | 42 | 26 | 24 | 52 | 38 | ... |
| 7 | 25 | 60 | 30 | 45 | 28 | ... |
| 8 | 22 | 30 | 55 | 44 | 25 | ... |
| 9 | 25 | 65 | 45 | 66 | 43 | ... |
| 10 | 60 | 28 | 48 | 50 | 20 | ... |
| ... | ... | ... | ... | ... | ... | ... |

INFORMATION PROCESSING APPARATUS, PRINT TIME INFORMING METHOD, AND COMPUTER-READABLE MEMORY MEDIUM STORING PROGRAM THEREIN

BACKGROUND OF THE INVENTION

1. Field of the Invention

The invention relates to an information processing apparatus and an information processing method for processing characters or an image document and outputting, and to a computer-readable memory medium storing therein a program for realizing such a method. More particularly, the invention relates to an information processing apparatus and a print time informing method for calculating a time that is required for a printing process before the start of printing and informing the user of the print time, and to a computer-readable memory medium storing therein a program for realizing such a method.

2. Related Background Art

Hitherto, in a printer driver for forming print data to be transmitted to a printing apparatus, the user has to perform various print setups, for example, he has to set: a print object to designate print quality such as print resolution, print gradation, or the like; a print layout to designate a both-side print, an N-in-one page print, or a booklet print; a paper delivery method to designate staple, saddle stitch, or sort; a paper feeding method to designate a paper feeding unit every page; and the like. To perform the print setups by using such a printer driver, the user has to set them in consideration of an effect of each print setup, so that an advanced knowledge is necessary.

For this purpose, the recent printer driver has a plurality of print environments defining a plurality of print setups, and a name (standard print, 2-page print, confidential, bit map development, photograph image, booklet print, etc.) which can be easily understood by the user is added to each print environment and displayed to a user interface. Therefore, if the user discriminates the name of the print environment from a plurality of print environments (also called "print profiles") and selects a desired print environment, a plurality of print setups defined among the print environments (print profiles) are automatically performed and the print data can be formed on the basis of the print setup. Therefore, the user can relatively easily obtain a desired print output.

However, although the printer driver takes into consideration a purpose of allowing the user to easily understand the print environment, nothing is considered about a method of allowing the user to understand a time that is required for a printing process in accordance with each print environment. In this case, the print time largely differs depending on the print environment and when the user arbitrarily selects the print environment, it is presumed that a print time longer than he has expected is required. Use efficiency of the printer driver is not high for the user from a viewpoint of time.

There is a method whereby the printer driver forms print data, in a printer and a print server, print quality (resolution, gradation, data amount) of the print data is analyzed, a time that is required for the printing process is calculated, and the user is informed of a time which is required for a print output and the time at which the print output is obtained. However, according to the method whereby, in the printer and print server, the time is calculated and informed to the user, in order to obtain a print output by another method when the user is dissatisfied with the time, it is necessary to form the print data again from an application and dissatisfaction of the user still remains.

The contents of the print data which is analyzed in the printer and print server are no more than the print quality regarding the data amount, print resolution, and print gradation of the print data. There is not a method which takes into consideration a print time which is required for conditions (other than the print quality) such as a print layout or the like for designating an N-in-one page print (the print data of N pages is reduced, arranged, and printed onto a recording paper of one page) or a booklet print (print pages are rearranged in booklet order and print data of four pages is reduced, arranged, and printed in accordance with a double spread direction in which they are booklet printed onto a recording paper of one page). The time which is actually required for the printing process cannot be accurately calculated.

A direct printer such that a memory card slot is formed in the printer and an image stored in a memory card can be recorded without passing through a host computer has also been proposed. A small printer represented by an ink jet printer such that a color image like a photograph can be recorded has also been put into the market. Photograph image quality can be easily obtained.

Recording media having an ink receptor layer are also being improved, and they have a feature such that an image which is sharper than that in case of recording onto a plain paper and has excellent coloring performance can be recorded and a texture of the paper is good. Owing to those recording media, a degree of freedom of the user who selects a proper medium in accordance with a required image level is being widened more and more. Therefore, a variety of recording modes for improving quality of a recording image can be set. The number of recording modes lies within a range from a few kinds to tens of kinds. Since the time that is required for recording also changes in dependence on the recording medium and a setting state of the recording mode, a print mode which takes a time longer than expected by the user also exists. It is difficult for the user to easily select a desired print mode.

The problem is not limited to the print time. In the current print system, it is difficult that the user compares and examines the relations between the image qualities which are obtained from the recording media and the costs thereof, selects a proper relation from the several media, and executes the recording of high cost performance.

That is, there is a drawback such that it is difficult to integrally judge the print quality, the costs which are required for printing, and the recording time before instructing the print through the printer driver and select the kind of recording medium (hereinafter, referred to as a media type) and the print mode, so that a working efficiency deteriorates.

SUMMARY OF THE INVENTION

The invention, therefore, is made in consideration of the above conventional example and it is an object of the invention to provide a function for informing the user of a print time which is required for a printing process by using a printer driver before the print is started. In consideration of the above object, another object of the invention is to enable the user to select a desired print purpose by calculating print times every plural print purposes and inform the user of each print time. In consideration of the above object, still another object of the invention is to enable the user to select a desired print environment by calculating a print time every print environment and inform the user of each print time. By previously informing the user of the print time, the user can make a final decision about the execution of the print.

The invention is also made in consideration of the above points and it is an object of the invention to enable a proper media type and a proper print mode to be selected from a variety of media types and print modes by using a user interface of a printer driver having high operability, thereby preventing the occurrence of improper setup by the user.

To accomplish the above objects, according to the invention, there is provided an information processing apparatus for forming print data to be printed by a printing apparatus, comprising: obtaining means for obtaining draw information based on a print document which is formed by an application; setting means for setting print set information at the time of executing a printing process of the print data by the printing apparatus; and estimating means for estimating a print time which is required for the printing process on the basis of the draw information obtained by the obtaining means and the print set information set by the setting means.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 8 is a diagram showing a print time table;

FIG. 14 is a diagram showing an example of a main section on the property window;

FIG. 19 is a diagram showing an example of the paper tab section on the property window.

DETAILED DESCRIPTION OF THE PREFERRED EMBODIMENTS (First Embodiment)

An embodiment of the invention will be described hereinbelow with reference to the drawings.

<Construction of Print System>

Figure 1:
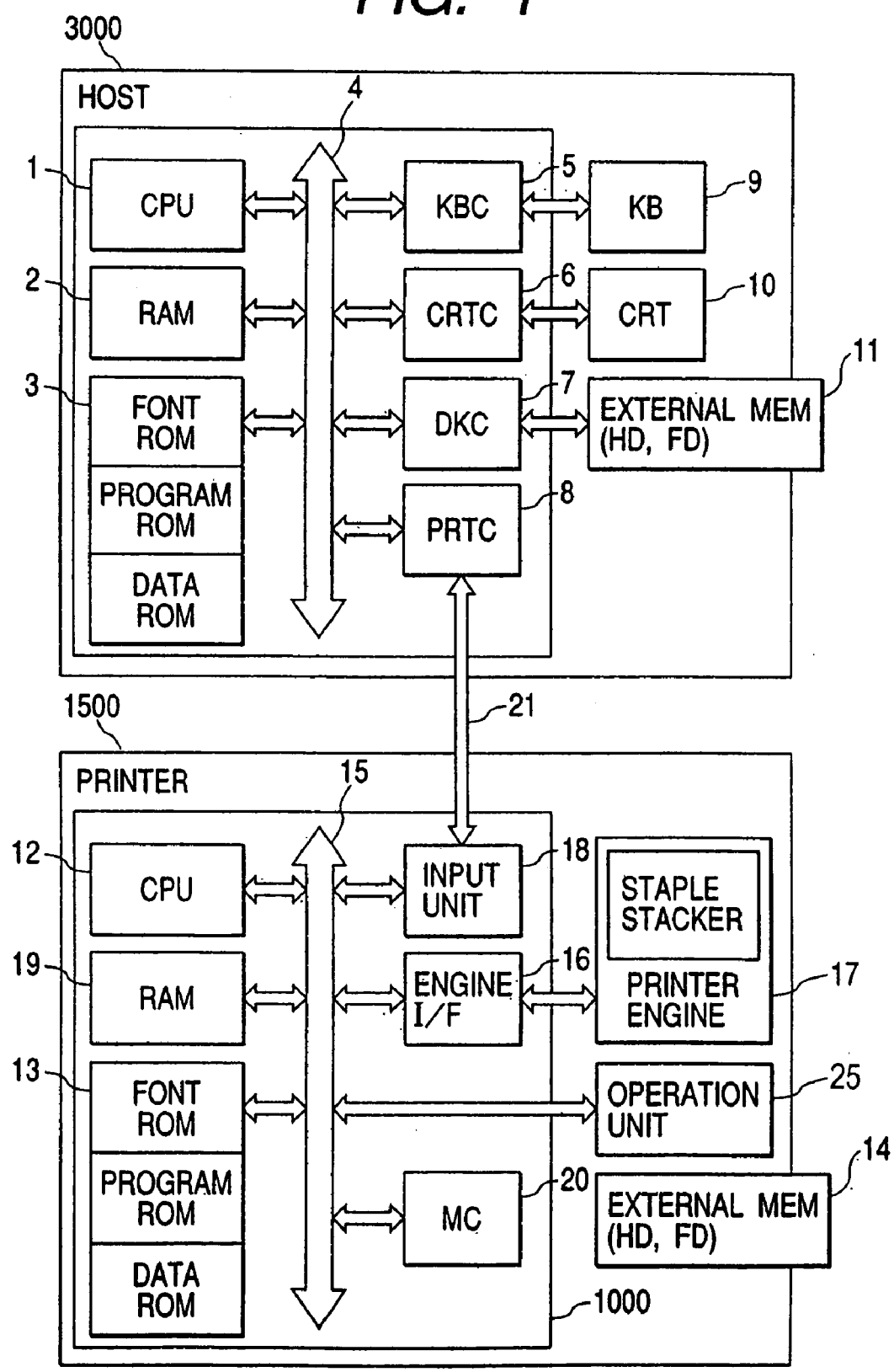
FIG. 1 is a block diagram of a print system comprising a host computer and a printer.

FIG. 1 is a block diagram of a print system comprising a host computer 3000 and a printer 1500.

In FIG. 1, the host computer 3000 has a CPU 1 for executing a process of a document in which a figure, an image, characters, a table (including a spreadsheet or the like), and the like exist mixedly on the basis of a document processing program or the like stored in a program ROM in an ROM 3. The CPU 1 integrally controls each device connected to a system bus 4. An RAM 2 functions as a main memory, a work area, or the like. Each module of a printer driver program of the invention is read in the RAM 2 and the CPU 1 executes a process on the basis of each module.

A keyboard controller (KBC) 5 controls a key input from a keyboard 9 or a pointing device (not shown). A CRT controller (CRTC) 6 controls a display on a CRT display 10. A printer setup window, which will be explained hereinlater, is also displayed on the CRT 10.

A disk controller (DKC) 7 controls an access to an external memory 11 such as hard disk (HD), floppy disk (FD), or the like for storing a boot program, various applications, font data, a user file, an edition file, and the like. Each module of a printer driver program of the invention has been stored in the external memory 11 or ROM 3 and is read out and stored into the RAM 2 as necessary.

A printer controller (PRTC) 8 is connected to a printer 1000 through a predetermined bidirectional interface (I/F) or a network 21 and executes a communication control process with the printer 1500. The CPU 1 executes, for example, a developing (rasterizing) process of an outline font into a display information RAM set on the RAM 2, thereby enables WYSIWYG (function for making display contents coincide with print contents) on the CRT 10. The CPU 1 executes a program for realizing a procedure of a flowchart, which will be explained hereinlater, opens various registered windows on the basis of a command instructed by a mouse, a cursor, or the like (not shown) on the CRT 10, and executes various data processes.

In the printer 1500, a printer CPU 12 integrally controls accesses to various devices connected to a system bus 15 on the basis of a control program or the like stored in a program ROM in the ROM 13 and outputs an image signal as output information to a printer engine 17 connected through an engine I/F 16. The printer engine 17 has a staple stacker for executing the stapling operation.

The CPU 12 can communicate with the host computer through the network 21 and notify the host computer 3000 of information or the like in the printer. Reference numeral 19 denotes an RAM which functions as a main memory, a work area, or the like of the CPU 12. An input unit 18 can control the communication with the host computer 3000 with respect to status information or the like such as print status information or the like through the network and inform the host computer 3000 of the information or the like in the printer. The input unit 18 is called a network board.

A memory controller (MC) 20 controls an access to an external memory 14 such as hard disk (HD), floppy disk (FD), or the like for storing a boot program, various applications, font data, a user file, an edition file, and the like. An operation unit 25 includes a display panel and a keyboard, provides information to the operator, and allows an instruction to be inputted from the operator.

<Function of Printer>

Figure 10:
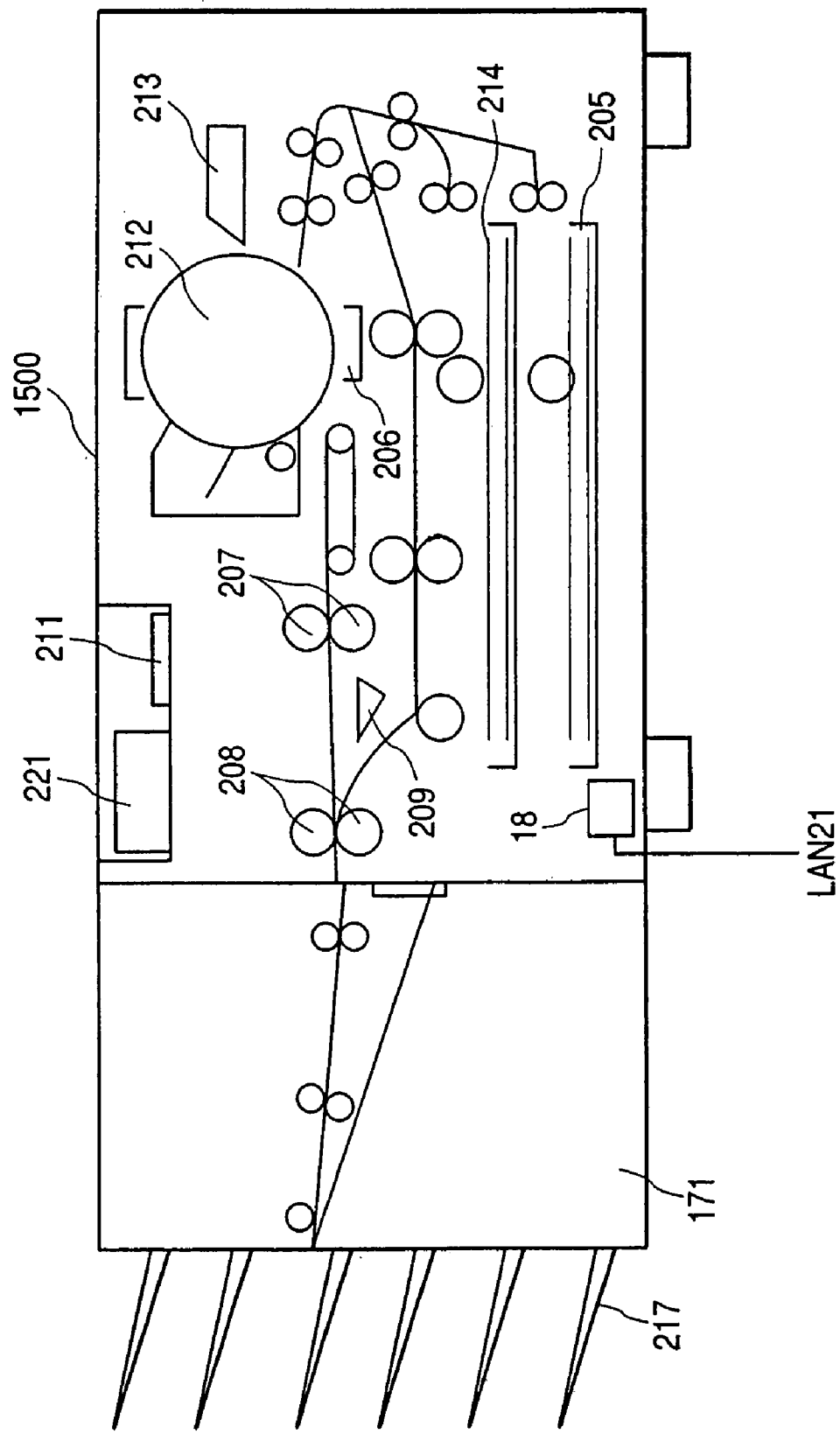
FIG. 10 is a cross sectional view of a printer showing a mechanism of a printer engine 17.

FIG. 10 is a cross sectional view of the printer 1500 showing an outline of a mechanism of the printer engine 17.

A laser driver 221 drives a laser emitting unit 211 so as to emit a laser beam according to the image data which is formed on the basis of the print data received from the host computer 3000. The laser beam is irradiated onto a photosensitive drum 212, so that a latent image according to the laser beam is formed on the photosensitive drum 212. A developing agent is adhered to the portion of the latent image on the photosensitive drum 212 by a developing device 213. A recording paper is fed out of a cassette 214 or a cassette 205 at timing synchronized with the start of irradiation of the laser beam and conveyed to a transfer unit 206, and the developing agent adhered onto the photosensitive drum 212 is transferred onto the recording paper. The recording paper on which the developing agent has been adhered is conveyed to a fixing unit 207. The developing agent is fixed onto the recording paper with heat and a pressure of the fixing unit 207. The recording paper which passed through the fixing unit 207 is delivered by delivery rollers 208.

If a both-side recording mode has been set, after the recording paper is conveyed to the delivery rollers 208, the rotating direction of the delivery rollers 208 is reversed, thereby guiding the paper onto a paper refeed conveying path by a flapper 209. If a multiplex recording mode has been set, the recording paper is guided to the refeed conveying path by the flapper 209 lest the recording paper is conveyed to the delivery rollers 208. The recording paper guided to the refeed conveying path is supplied to the transfer unit 206 at the timing mentioned above.

The recording paper delivered by the delivery rollers 208 is inserted into a delivery device 171. The delivery device 171 is controlled by a delivering method which is designated by the print data from the host computer 3000. If there are a plurality of copies of the print data and a sorting mode has been designated, the papers are sequentially delivered one page by one in order from an upper bin onto a sorter 217 of a vertical driving type.

<Software Construction of Host Computer>

Figure 2:
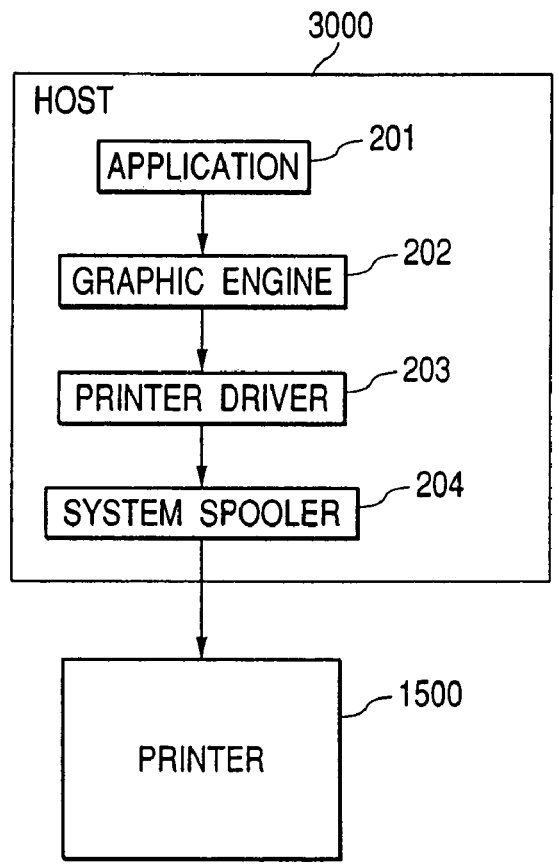
FIG. 2 shows software for printing in the host computer.

In such a system, the software for allowing the host computer 3000 to print is constructed as shown in FIG. 2. That is, in case of printing a print document such as a text or the like formed by an application 201, the application forms a draw command by using an interface function specified by the OS (Operating System) on the basis of the print document. The formed draw command is supplied to a graphic engine 202 as a part of the OS by a printing request from the application. For example, in case of the Windows OS (registered trademark of Microsoft Corporation in U.S.A.), the graphic engine 202 is called GDI. The graphic engine 202 obtains a draw command (first draw function) using an interface function (GDI function: Graphical Device Interface) specified by the GDI from the application 201, converts it into a draw command (second draw function) which can be interpreted by a printer driver 203 that is peculiar to the printer 1500, and sends it to the printer driver 203. The printer driver 203 forms print data suitable for the printer 1500 on the basis of the draw command (DDI (Device Driver Interface) function) received from the graphic engine 202.

The printer driver 203 sends the formed print data to a system spooler 204. The system spooler spools the print data and transmits the print data to the printer in accordance with a schedule of the printer.

Figure 3:
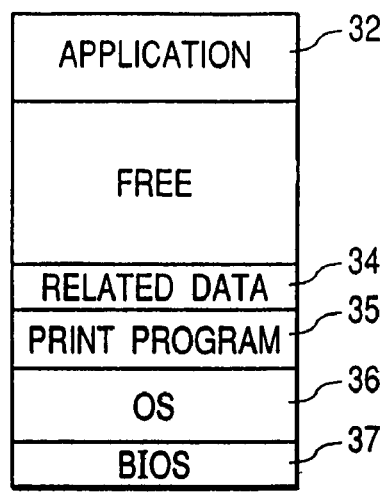
FIG. 3 is a diagram of a memory map at the time of printing or printer setup in the host computer.

FIG. 3 shows an example of a memory map in the RAM 2 upon printing in the host computer 1500 or upon setting of the printer. An application 32 executes the print by using an OS 36 and a print program (printer driver) 35. A BIOS 37 is called a basic input/output system and includes therein a program for driving a parallel interface, a serial interface, or the like which is connected to the printer 1500.

The print control program (printer driver) is constructed by a plurality of modules. The following modules are included among the plurality of modules.

First, there is an obtaining module for obtaining draw information based on a print document which is formed by the application. The obtaining module obtains the draw information including an ID of each object constructing the print document prior to executing the print through the application and an expansion API. The obtaining module also obtains the second draw command (DDI function) which is issued by the OS on the basis of the first draw command (GDI function) issued by the application.

Figure 4:
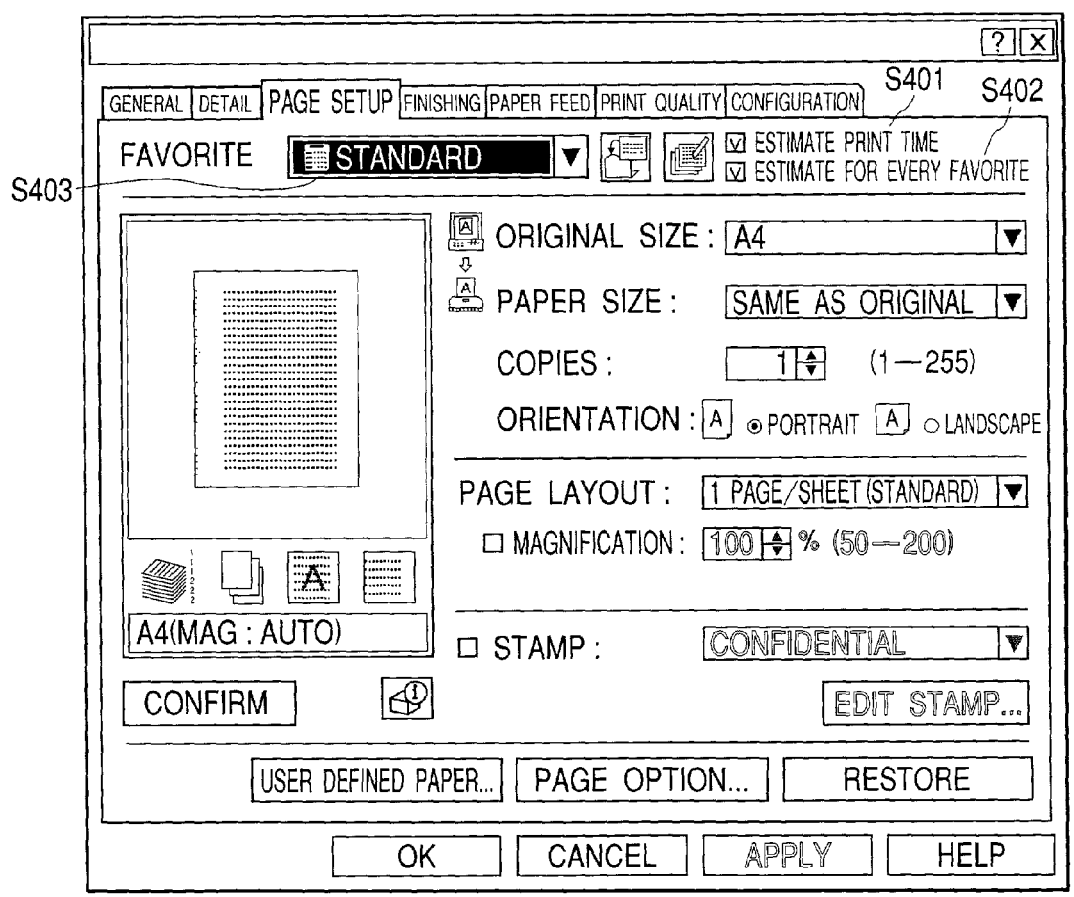
FIG. 4 is a diagram showing a user interface for setting whether an estimation of a print time is performed on a window or not.

There is also a user interface providing module for providing a user interface for setting the print set information at the time when the printing process of the print data is executed in the printing apparatus. The user interface providing module provides a user interface shown in FIG. 4. This user interface is displayed on a display unit through the OS. The user interface shown in FIG. 4 is constructed by a plurality of sheets and various print setups can be performed every sheet. As print set information, there are information regarding the print quality in the print data (this information is set by a sheet of the print quality) and information regarding the print layout (which is set by "page layout" on a page set sheet). Further, the user interface providing module provides a user interface for setting a print profile (S403 in FIG. 4) obtained by collecting a plurality of print set information at the time when the printing process of the print data is executed in the printing apparatus.

There is also an estimating module for estimating a print time which is required for the printing process on the basis of the draw information obtained by the obtaining module and the print setup set by the user interface. The details of the estimating module will be explained with reference to a flowchart, which will be mentioned hereinlater. The estimating module estimates a print time which is required for the printing process every plural print profiles which are set through the user interfaces (S401 and S402 in FIG. 4) which are provided by the user interface providing module.

Figure 9:
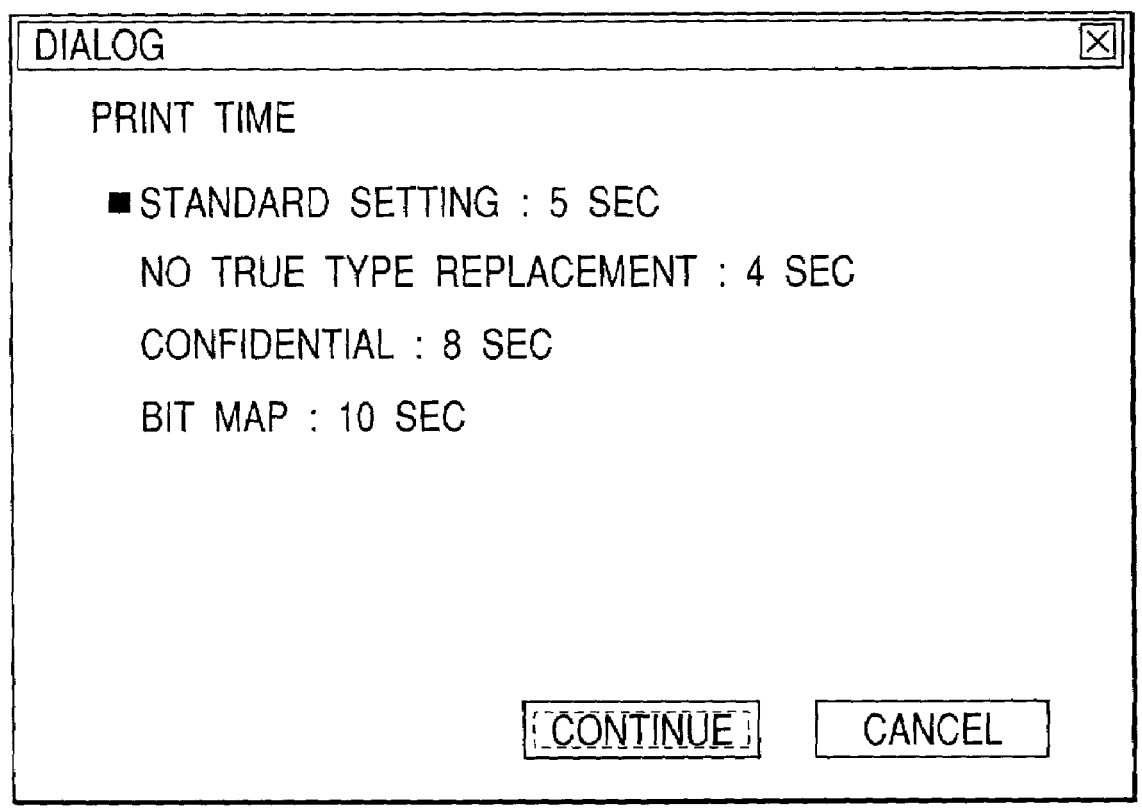
FIG. 9 is a diagram showing a dialog box for informing the user of the print time.

There is also an informing module for informing the user of the print time estimated by the estimating module before the print data is formed. The informing module provides the print time and a user interface (FIG. 9) for promoting the input of an instruction for executing the printing process which needs the print time. This user interface is displayed on the display unit through the OS. As shown in FIG. 9, the user interface informed by the informing module can accept the input of an instruction for canceling the execution of the printing process which needs the print time.

There is also a forming module for forming the print data based on the print document after the print time was informed by the informing module.

The modules further include a transmitting module for transmitting the print data to the printing apparatus through the network.

Related data 34 also includes set information which is set and used by the printer driver and a structure called DEVMODE in addition to the setups for printing such as paper size, layout information, and the like.

A procedure for estimating and informing the print time every print environment called "favorites" including other conditions such as print quality, print layout, and the like will now be described with reference to FIGS. 4, 8 and 9 and flowcharts of FIGS. 5 to 7.

<Print Time Informing Method and Procedure for Displaying Print Time Every Favorite>

The user sets a plurality of print set information as a print environment (favorite: S403 in FIG. 4) such as print layout, paper size, print quality, paper delivery method, and the like as a print processing method in accordance with the printer which is used by using the user interface that is provided by the user interface providing module of the printer driver shown in FIG. 4. As an example of the method of setting the print set information, there is a method whereby when the user calls the printer setup which is provided from the operating system (OS) or the like, the printer driver is called from the OS. The user interface providing module of the printer driver provides the user interface for setting the set information that is peculiar to the printer to the OS. The OS allows the user interface window to be displayed on the display unit through the display driver. The user performs the setup on this window.

In the embodiment, it is assumed that the setup is performed by such a method.

FIG. 4 shows an example of a window for performing the printer setup in the case where the printer setup is called by the user. In the example, there are a plurality of sheets for performing the setup such as "general", "detail", "page setup", "finishing", "paper feed", "print quality", "configuration", and the like. The user selects a desired user interface by switching the setup sheets in accordance with the information to be set. FIG. 4 shows an example in the case where the "page setup" window is selected from those setups. On this window, the user sets each item by using the pointing device such as a mouse or the like or the keyboard and executes the setup (S401 in FIG. 4) for estimating the print time.

Figure 5:
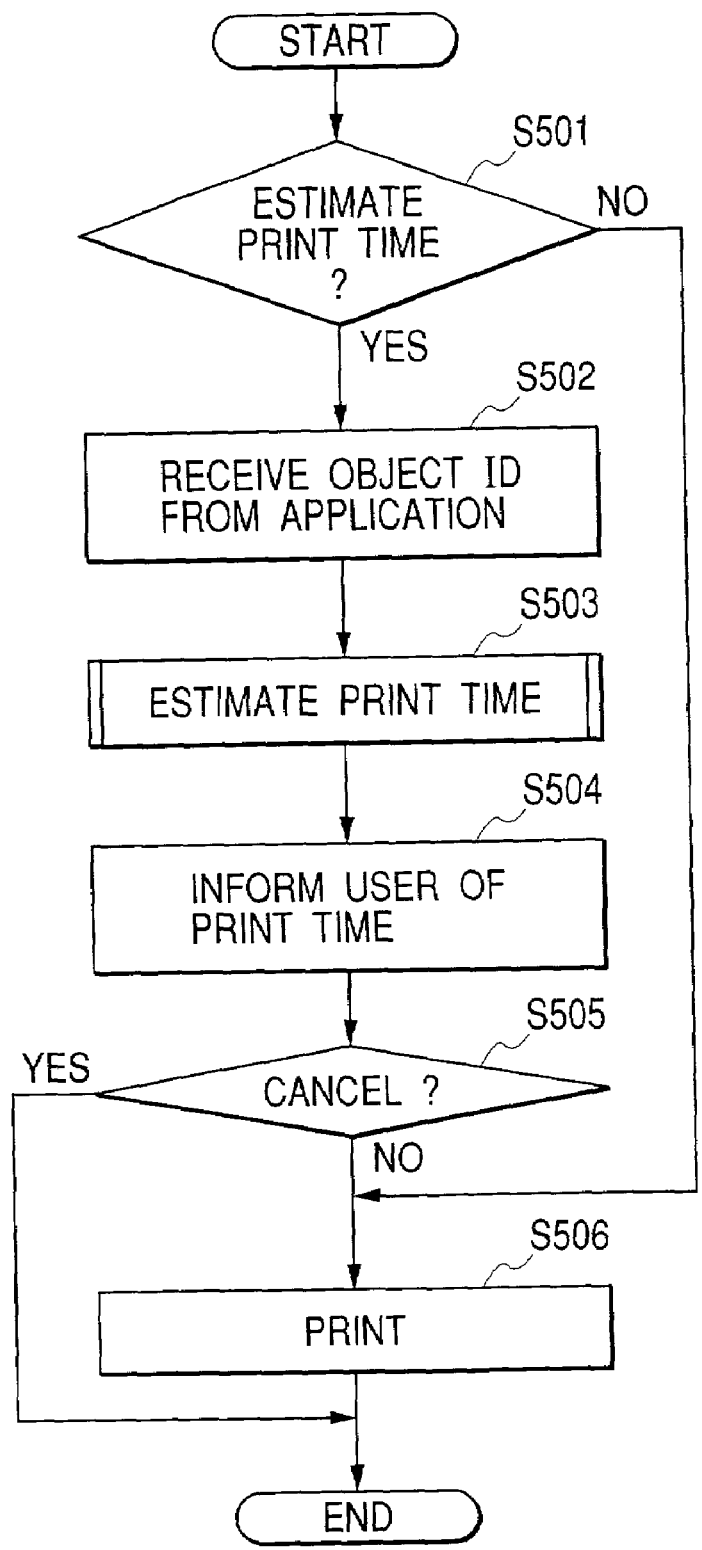
FIG. 5 is a flowchart for a procedure for estimating the print time.

FIG. 5 is a flowchart regarding a procedure in the case where the print time estimating setup is executed on the window of FIG. 4 and the print is executed.

First, in step S501, whether an "estimate print time" check box S401 in FIG. 4 is ON or not is discriminated. If it is OFF, the normal print is executed and the processing routine is finished.

If the "estimate print time" check box is ON, the obtaining module of the printer driver is informed of an ID every draw object defined in the printer driver from the application (step S502).

It is notified by using means such that the application uses an API function (expansion API) which is exported by the printer driver and the obtaining module is informed of the object ID. Therefore, the application 201 and printer driver 203 can transmit and receive data without using the graphic engine 202.

Subsequently, in step S503, the estimating module in the printer driver estimates the print time on the basis of the draw object ID received by the obtaining module from the application in step S502. Details in step S503 will be described hereinlater with reference to the flowchart of FIG. 6.

When the estimation of the print time is finished with respect to all of the favorites in step S503, the CPU 1 displays the print time onto the CRT 10 as a display unit every print environment on the basis of the informing module in the printer driver (step S504). FIG. 9 shows such an example and relates to a display example in the case where the favorite (print environment) of "standard setup" is selected and the print is executed.

The user can instruct "execute" and "cancel" of the print before the print is executed with reference to the print time shown by the user interface shown in FIG. 9. Since the print time in the case where the print is executed in each favorite is displayed, it becomes reference data in case of printing next time.

If it is determined that a "cancel" button in FIG. 9 is pressed (YES in step S505), on the basis of a deleting module in the printer driver, the CPU 1 deletes the draw information which was received from the application and held and finishes the processing routine without executing the printing process. On the contrary, if it is decided that a "continue" button is pressed by the user (NO in S505), the CPU 1 executes a forming process of the print data by the printer driver 203 on the basis of the draw command obtained from the graphic engine 202 in step S506 and finishes the processing routine.

Figure 6:
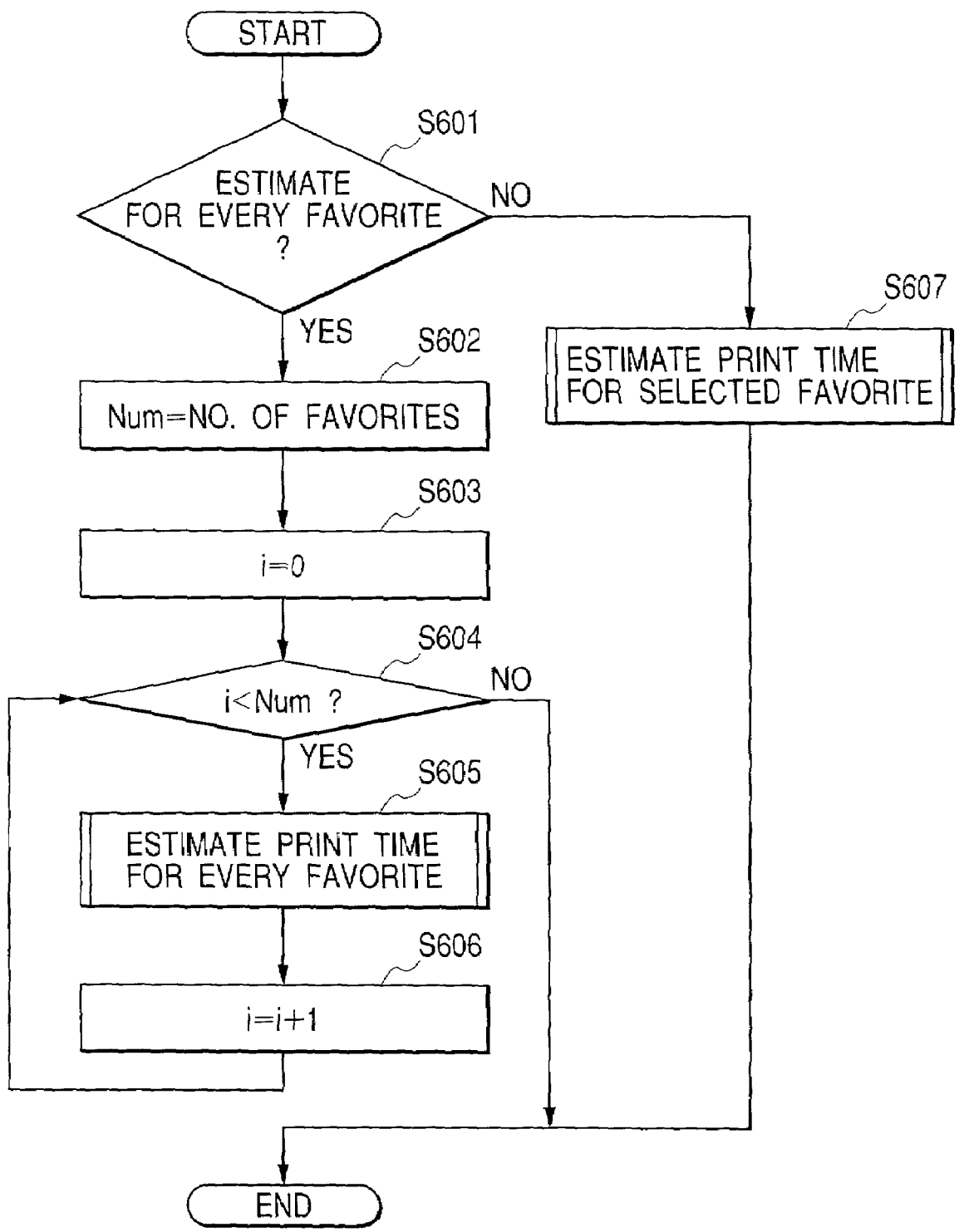
FIG. 6 is a flowchart for a procedure for estimating the print time.

FIG. 6 is the flowchart for explaining the processes of the CPU 1 based on the printer driver for calculating the number of print profiles to estimate the print time at the time of estimating the print time (step S503 in FIG. 5).

First, in step S601, the CPU 1 discriminates whether an "estimate for every favorite" check box S402 in FIG. 4 is ON or not. If it is determined that the check box S402 is ON, in step S602, the CPU 1 searches the number of print profiles ("favorites") as print environments stored in a registry on the basis of an instruction from the printer driver and sets it into a variable "Num". In step S603, the CPU 1 sets "0" into a variable "i" and executes the print time estimating process (S605) every print profile until the variable "i" is equal to "Num" (step S604).

Figure 7:
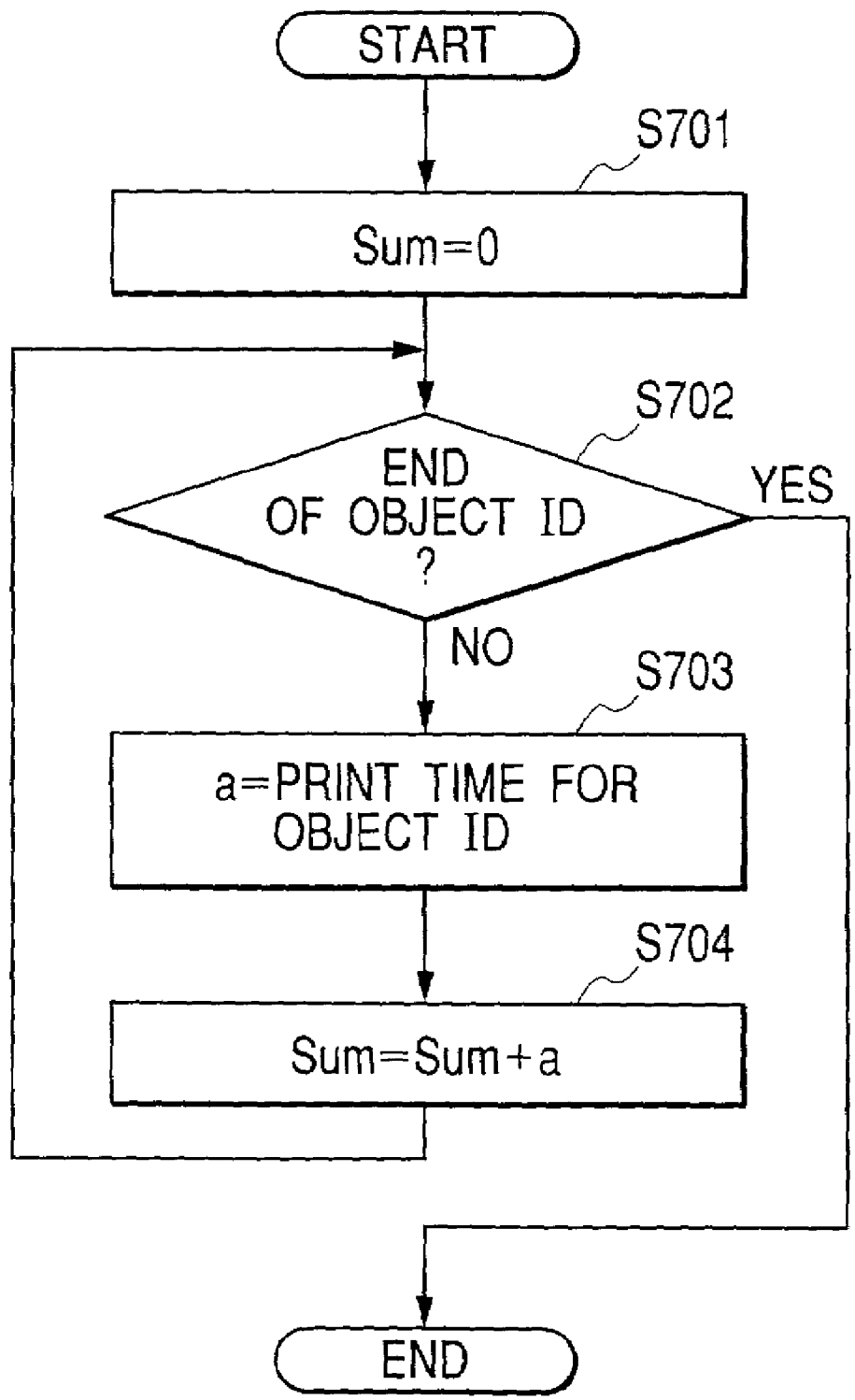
FIG. 7 is a flowchart for a procedure for estimating the print time every favorite.

FIG. 7 is the flowchart for explaining the process of the CPU 1 based on an estimating module for estimating the print time (step S605).

In step S701, the CPU 1 initializes "Sum" as a sum variable value of the print times to "0" on the basis of an instruction of the estimating module. Subsequently, in step S702, the CPU 1 discriminates the presence or absence of the draw object ID informed from the application in step S502. If it does not exist, since this means that the print times of all of the draw objects have been calculated, the time that is required for the printing process is estimated on the basis of the "Sum" value indicative of the numerical value of the sum time and the print time estimating process is finished. The print time which is estimated on the basis of the "Sum" value is a total value of the following three times: that is, a print data forming time which is required to form the print data in the printer driver; a rasterizing time which is required to rasterize and form the image data on the basis of the print data in the printing apparatus; and a delivery time which is required until the image is formed on the basis of the image data and the paper is delivered to a delivery unit after the recording paper was fed. Although the rasterizing time and the delivery time are different in dependence on the kind of printing apparatus, since those values have previously been held in the printer driver (since the printer driver is prepared in correspondence to the printing apparatus), they can be easily obtained. Although not shown, a time conversion table for obtaining the print time (print data forming time+ rasterizing time+recording time) from the "Sum" value as a time numerical value has also previously been held in the RAM 2 or external memory 11 as memory means in a manner similar to a print time table in FIG. 8.

If the object ID exists in step S702, the CPU 1 searches the print time every target shown by the draw object ID on the basis of the print time table in FIG. 8 and sets it into a variable (a) in step S703.

The print time table is as shown in FIG. 8. The numerical value of the time which is required for printing is obtained on the basis of the draw object ID informed from the application in step S502 and the "favorite name" in the print profile obtained from the registry and set into the variable (a). In step S704, the CPU 1 adds the print time (a) which is required every draw object to the sum value "Sum" of the print times on the basis of an instruction of the estimating module.

On the basis of the estimating module, the CPU 1 repeats the above process until the print object ID informed from the application does not exist, thereby calculating "Sum".

The estimating process of the print time of every favorite in step S605 is repeated until the variable "i" reaches the number "Num" of registered favorites as mentioned above (step S606). Even if the "estimate for every favorite" check box S402 in FIG. 4 is OFF in step S601, the foregoing print time estimating process is executed by using the favorite name set in a "favorite" check box S403 in FIG. 4 (step S607).

According to the information processing apparatus of the invention, the estimating means (process of the CPU 1 based on the estimating module in the printer driver) estimates the print time from the application obtained by the obtaining means (process of the CPU 1 based on the obtaining module in the printer driver) through the expansion API on the basis of the ID of the draw object constructing the print document. However, such a process can be also realized by using the following method instead of having the expansion API.

First, a printing request from the application is generated and the printer driver obtains the draw command (DDI function) through the OS. A spool module in the printer driver converts the DDI function as a draw command into data of an intermediate format (hereinafter, it is referred to as intermediate data) and spools the converted intermediate data as an intermediate file into spool means (work area in the RAM 2). In parallel with the spooling process of the spool module, the obtaining module obtains DEVMODE (structure in which the print set information has been described) showing the print profile obtained by collecting a plurality of print setups set by the user interface in the printer driver through the OS and allows the spool means to hold the DEVMODE in association with the intermediate data of the print document.

An analyzing module in the printer driver reads the intermediate data from the intermediate file and analyzes its contents, thereby recognizing an object attribute (draw object ID) of each intermediate data. On the basis of the object attributes of all of the intermediate data of the print document and the print time table (FIG. 8), the estimating module of the printer driver calculates the time numerical value and converts the time numerical value by using the foregoing time conversion table, thereby estimating the print time. According to the estimating process by the estimating module, a plurality of print profiles held in the spool means are read and the time numerical value is estimated every plural print profiles on the basis of the print set information set by each print profile.

The estimation of the time numerical value which is executed in consideration of the print profile will be simply explained. In the print layout in the print profile, explanation will be first made with respect to a case of executing a "2-page print (in the case where two logic pages (pages which are issued from the application)" are reduced and printed onto one sheet of recording paper) as a page layout. In case of performing the 2-page print, an arranging process for reducing each logic page and subsequently rearranging the reduced pages to a physical page is necessary. Although the print data forming time that is longer than the ordinary time, for example, by the time which is required for the reducing process (0.1 second is required for one physical page) and the time which is required for the arranging process (0.05 second for one physical page) is required, the rasterizing time becomes short because the number of physical pages is reduced to the half. If the staple mode is designated as a delivery method, a delivery time becomes longer, for example, by the time that is required for the stapling process (0.5 second per copy).

After the user is informed of the print time as a user interface shown in FIG. 9, if the user instructs the cancellation of the print on the user interface, the deleting module in the printer driver deletes the intermediate data of the relevant print document spooled in the spool means. On the other hand, if the user instructs the execution of the print on the user interface shown in FIG. 9, a despool module in the printer driver forms again the GDI function as a first draw command based on the print profile on the basis of the relevant intermediate data spooled in the spool means and outputs it to the graphic engine 202. When the DDI function as a second draw command formed again by the graphic engine 202 is received, a print data forming module in the printer driver forms print data (page description language) to be printed by the printing apparatus on the basis of the DDI function. The print data is transmitted to the printing apparatus by a transmitting module through the network (LAN 21).

(Second Embodiment)

In the second embodiment, in the printer 1500 described in the first embodiment, a system which can execute the printing process by using a plurality of kinds of recording media will now be described. The same component elements as those in the foregoing drawings are designated by the same reference numerals and will be explained.

The printer 1500 is connected to the host computer 3000 as an information processing apparatus of the invention through the interface 21. The printer 1500 receives a print control code and print data including draw data from the printer driver 203 and, contrarily, returns the information on the printer 1500 side to the host computer 3000 having the printer driver 203. In the embodiment, a serial type ink jet printer for printing by emitting a liquid ink is presumed as a printer 1500. Therefore, the printer 1500 can record to various media in accordance with a use application and a purpose in a range from a medium for a high quality image having an ink receptor layer for photograph gradation recording to a plain paper. To suppress lateral stripes on the image, devices in various recording modes such that the recording of one line is executed by scans of a plurality of number of times, and the like are provided for the printer.

A procedure at the time of executing the printing process in the print system including the host computer 3000 and printer 1500 mentioned above will now be described with reference to a flowchart of FIG. 11. First, in step S1101, the user instructs the print through the user interface displayed on the CRT display 10, so that the printer driver 203 inputs a print command as a DDI function through the graphic engine 202. In S1102, the printer driver 203 forms a print window and allows it to be displayed by using the CRTC 6. FIG. 12 shows an example of the print window. On this print window, the user can designate the print pages in a "pages to print" check box 1201 and the number of copies in a "copies" check box 1202, respectively.

Figure 12:
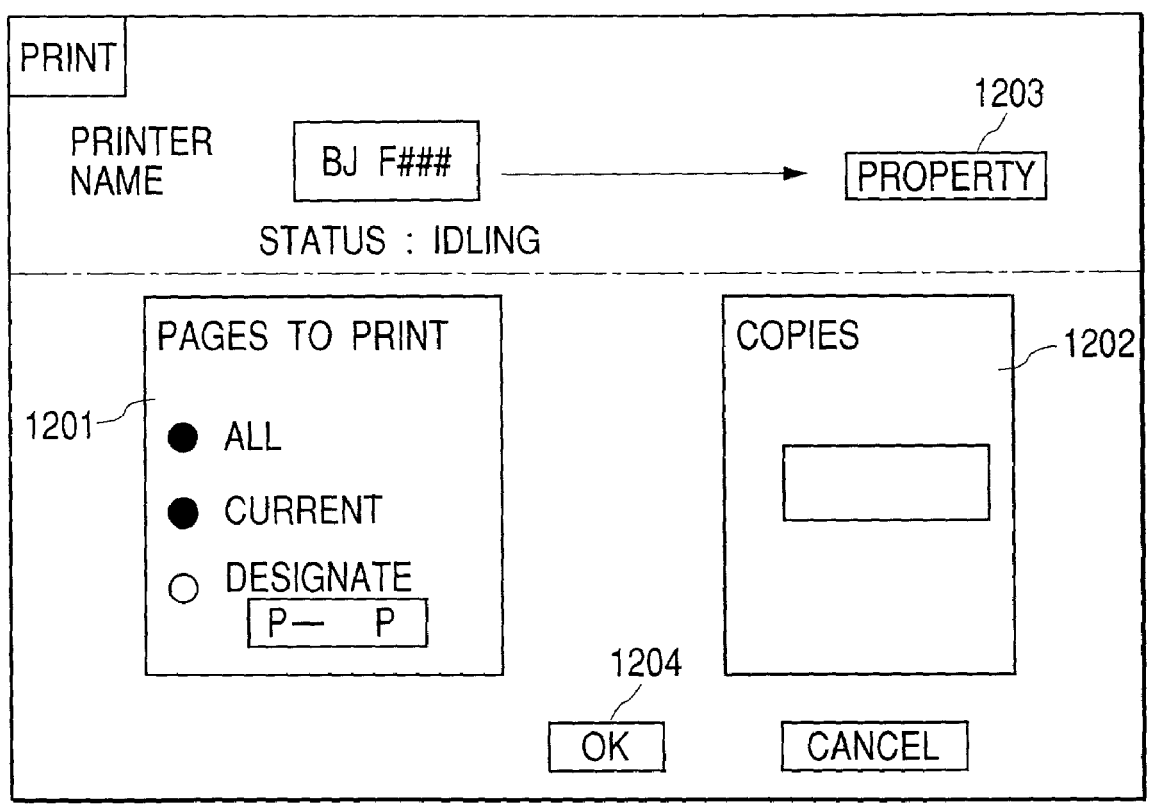
FIG. 12 is a diagram showing an example of a print window.
Figure 13:
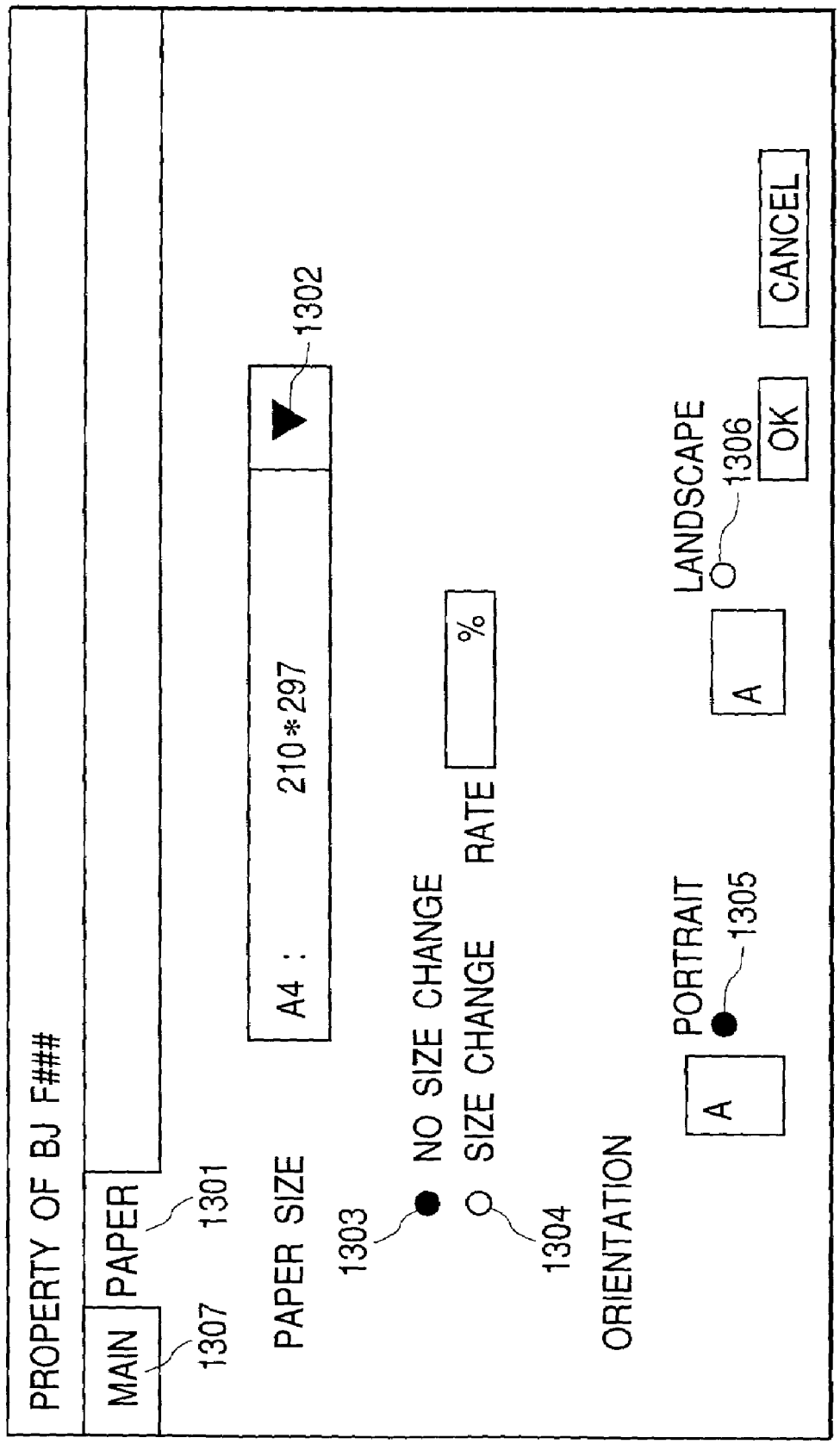
FIG. 13 is a diagram showing an example of a paper tab section on a property window.

In S1103, the printer driver 203 discriminates whether the designation of the print pages and the number of copies by the user has been finished or not. If it is determined that the print pages and the number of copies were designated by the user, the printer driver 203 opens a printer property window shown in FIG. 13 in S1104. The printer driver 203 can also open the printer property window in an interlocking relational manner with the depression of a "property" button 1203 at the upper right position on the print window shown in FIG. 12 by the user. When the printer property window is opened, the printer driver 203 first displays a paper tab section in a state where a paper tab 1301 has been pressed in S1105. FIG. 13 shows an example of the paper tab section on the property window. On the paper tab section, the user can select a desired paper size from a pull-down menu appearing when a pull-down key 1302 is pressed. In the diagram, a state where the A4 size has been selected is shown. Further, either a check box 1303 or 1304 is set to ON, thereby instructing whether the size is changed or not. If a size change print is selected, a rate is set. A print orientation is instructed by setting either a check box 1305 or 1306 to ON.

In S1106, the printer driver 203 discriminates whether the paper setup by the user has been finished or not. If the printer driver 203 determines that the paper setup by the user has been finished, the printer driver 203 displays a main section in S1107. By pressing a main tab 1307 by the user, the processing routine can also advance to a process for opening the main section on the property window.

Figure 14:
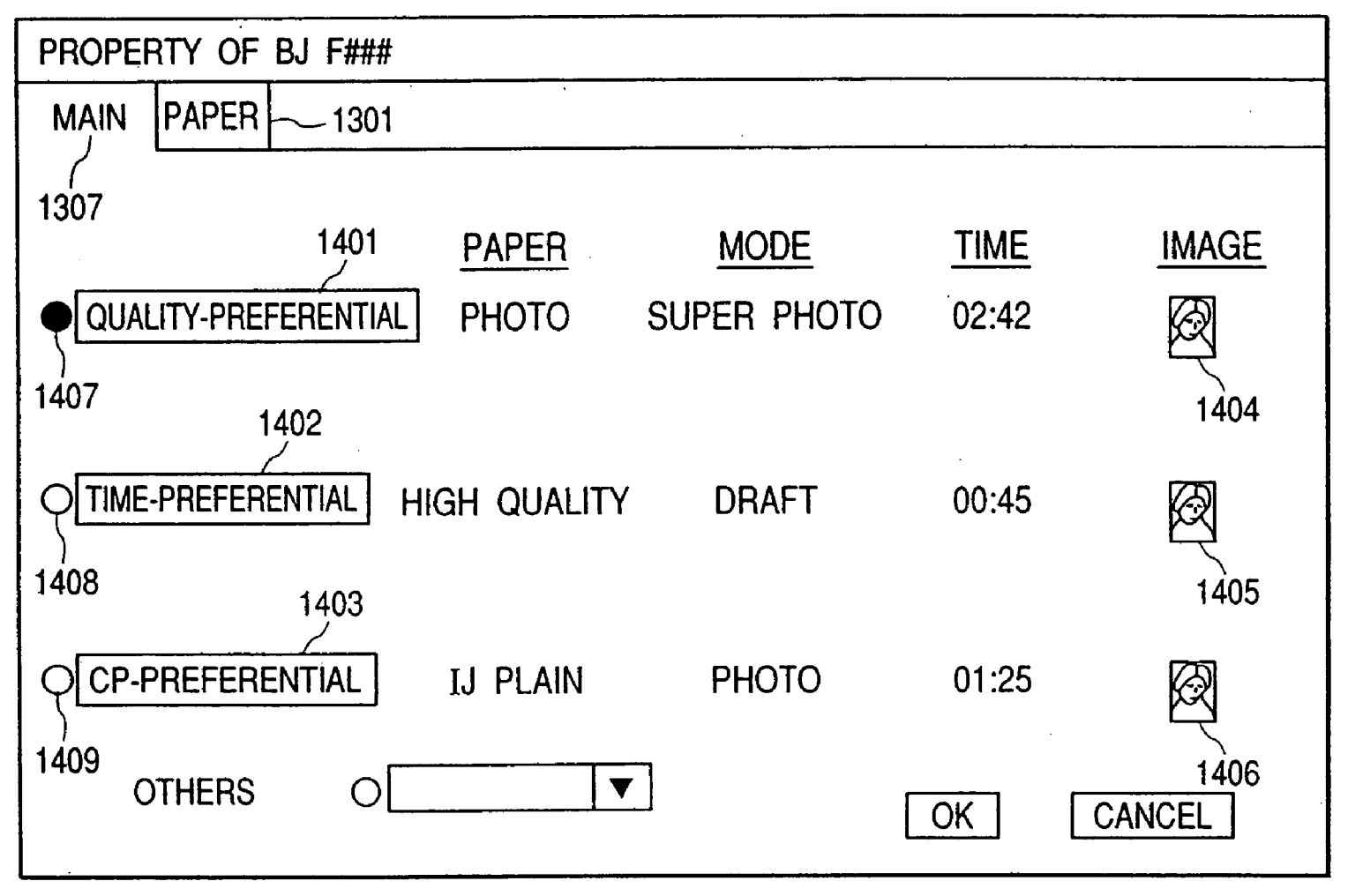

FIG. 14 shows an example of the main section on the property window. In the main section, three preferential items such as "quality-preferential" 1401, "time-preferential" 1402, and "CP-preferential" 1403 are set. A list of a paper, a recording mode, and an estimated recording time corresponding to each item is displayed. Further, when one of "image" buttons 1404 to 1406 corresponding to the respective items is depressed, a recording image window of a real size is opened. Thus, the user can confirm a pseudo recording result and perform a selection that is nearer to his hope. If the user wants to record onto a special medium such as an OHP paper or the like, the mode is set to a mode suitable for the medium by setting the other paper to ON.

As for the paper and the recording mode, a ratio of color ink in the recording image is calculated by the printer driver 203 of the host computer 3000, a list for photograph image quality, a list for graphic image quality, and a list for text image quality are automatically set in correspondence to the calculated ratio. A list of combinations determined for each image quality is displayed in the main section. Therefore, the contents of the list in the main section are changed in dependence on the recording image. By displaying a combination every preferential items, the selecting work is made easy and the system having excellent operability is realized.

Figure 15:
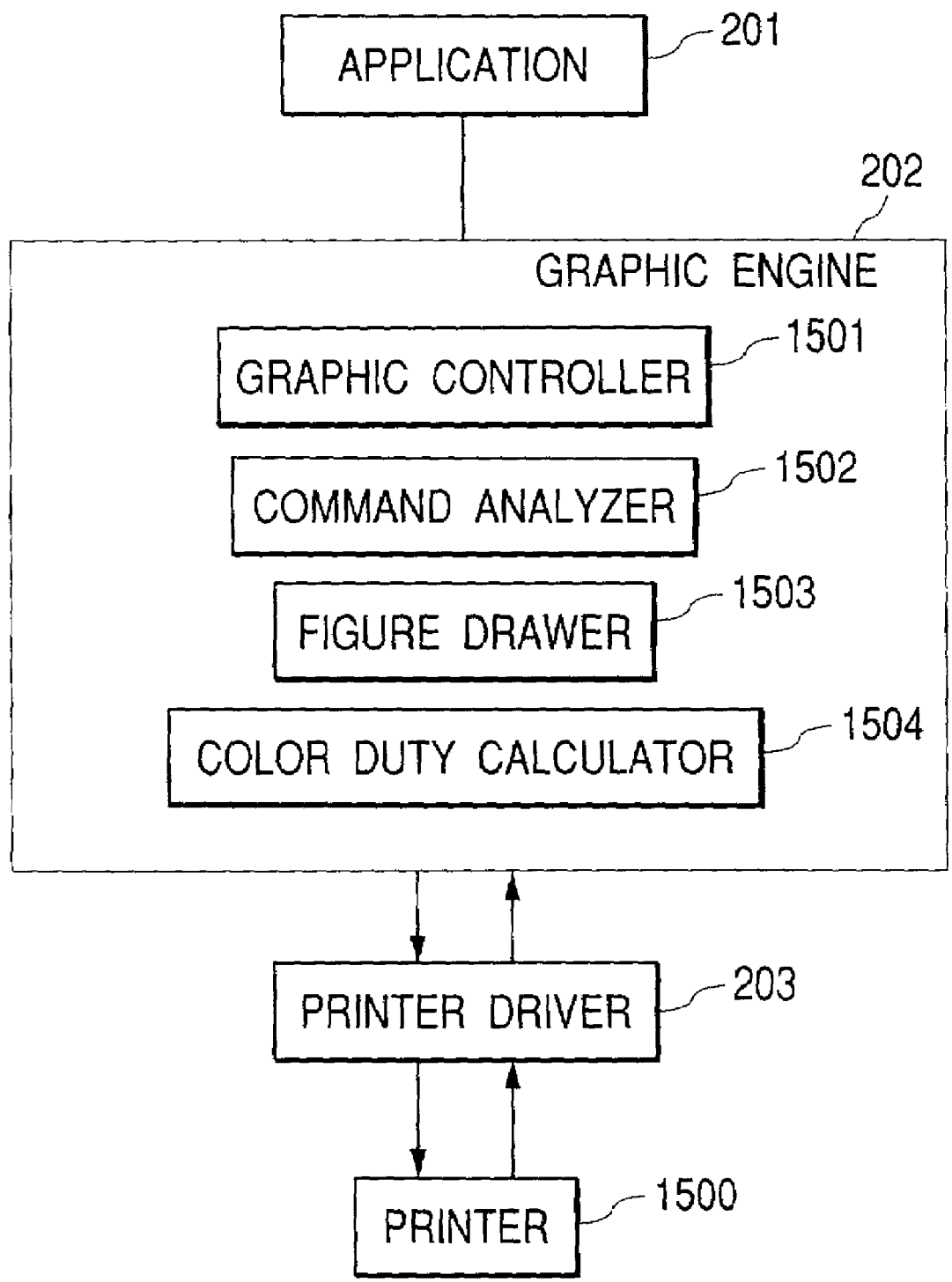
FIG. 15 is a block diagram showing a functional construction of a recording image discriminating function of a host computer 3000.

A discriminating method of the recording image will now be described with reference to FIGS. 15 and 16. FIG. 15 is a block diagram showing a functional construction of the host computer 3000. In the diagram, the application 201 sends an application command as a GDI function to the graphic engine 202 and requests the output of characters, figures, and the like to the printer 1500.

In the graphic engine 202, under a control of the graphic controller 1501, the application command (GDI function) received from the application 201 is analyzed by a command analyzer 1502. Further, it is converted into a data format depending on the image data or device as necessary by a figure drawer 1503 and sent to the printer driver 203. After it is converted into the image data by the figure drawer 1503, a ratio of color data which occupies in the recording data is calculated by a color duty calculator 1504. The calculated duty value is sent to the printer driver 203 together with the image data. The print data is sent to the printer 1500 together with the control command from the printer driver 203, and the printing process is executed. Although the color duty calculator 1504 has been described as a module of the graphic engine 202, the calculator 1504 is not necessarily limited to it but can also function as a partial module of the printer driver 203.

Figure 16:
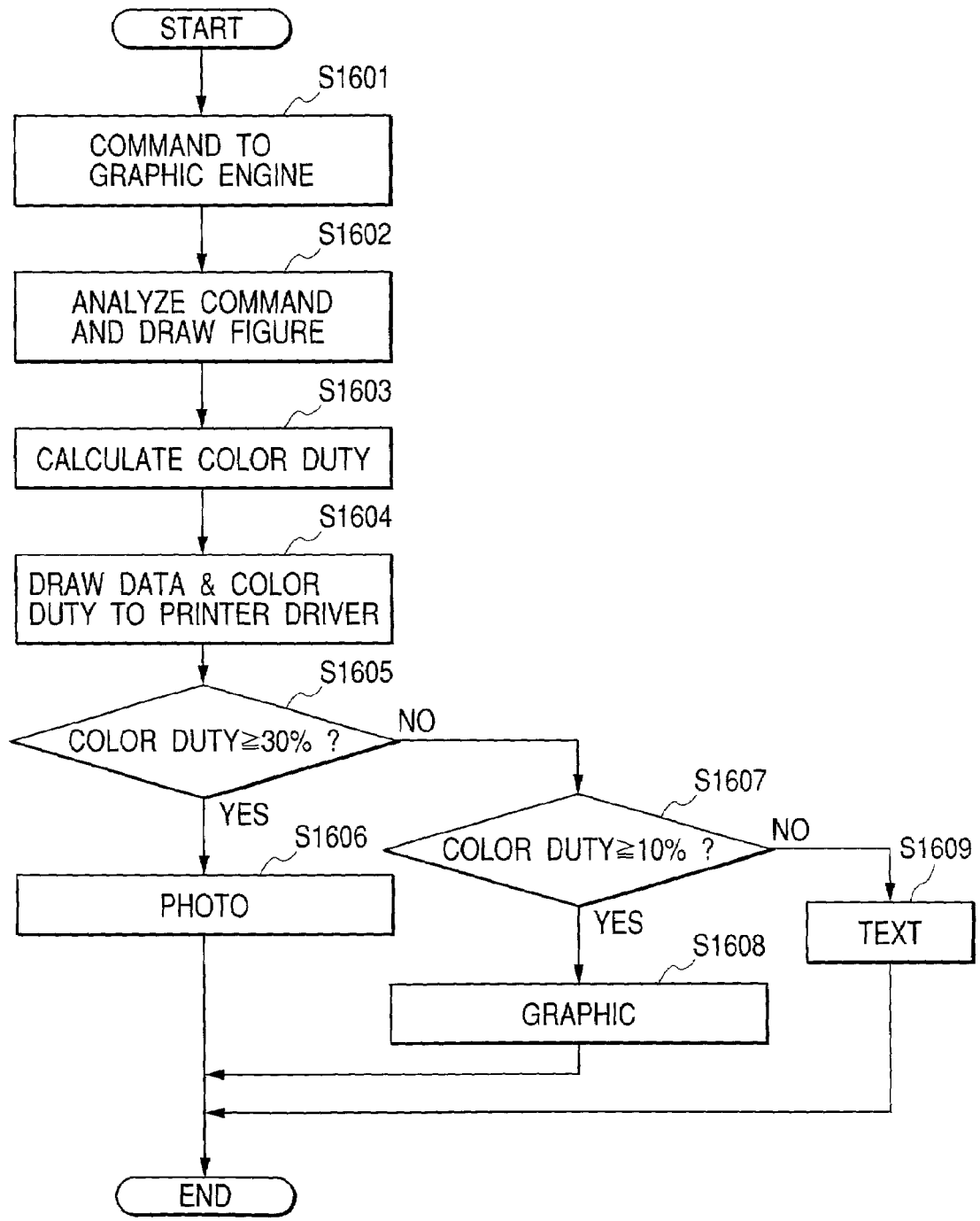
FIG. 16 is a flowchart regarding the discrimination of a recording image.

FIG. 16 is a flowchart regarding the discrimination of the recording image. In S1601, the application 201 sends the application command to the graphic engine 202. In S1602, an analysis of the application command and a figure drawing are executed by the graphic engine 202. In S1603, a color duty value is calculated. In S1604, the draw data and the color duty value are sent to the printer driver 203.

In S1605, the printer driver 203 discriminates whether the color duty value is equal to or larger than 30% or not. If it is determined that the color duty value is equal to or larger than 30%, the printer driver 203 sets the print setup into the list for photograph image quality in S1606. If it is determined that the color duty value is less than 30%, the printer driver 203 further discriminates whether the color duty value is equal to or larger than 10% or not in S1607. If it is determined in S1607 that the color duty value is equal to or larger than 10%, the printer driver 203 sets the print setup into the list for graphic image quality in S1608. If it is determined that the color duty value is less than 10%, the printer driver 203 sets the print setup into the list for text image quality in S1609. In FIG. 14, a list in the case where the print setup has been set into the list for photograph image quality is displayed.

As described above, the recording image is discriminated from the color duty value of the image and the list according to the discrimination contents is displayed. In the embodiment, although the discrimination about the recording image has been made in accordance with the ratio of the color data, another method whereby a ratio of text data is obtained or the like can be also used. In this case, for example, if the text print ratio is equal to or larger than a predetermined value, it is determined that such an image is an image constructed mainly by a text, it is sufficient to set the print mode to a normal recording mode (list for text image quality). If it is less than the predetermined value, it is sufficient to set the mode to a photograph recording mode (list for photograph image quality).

Figure 11:
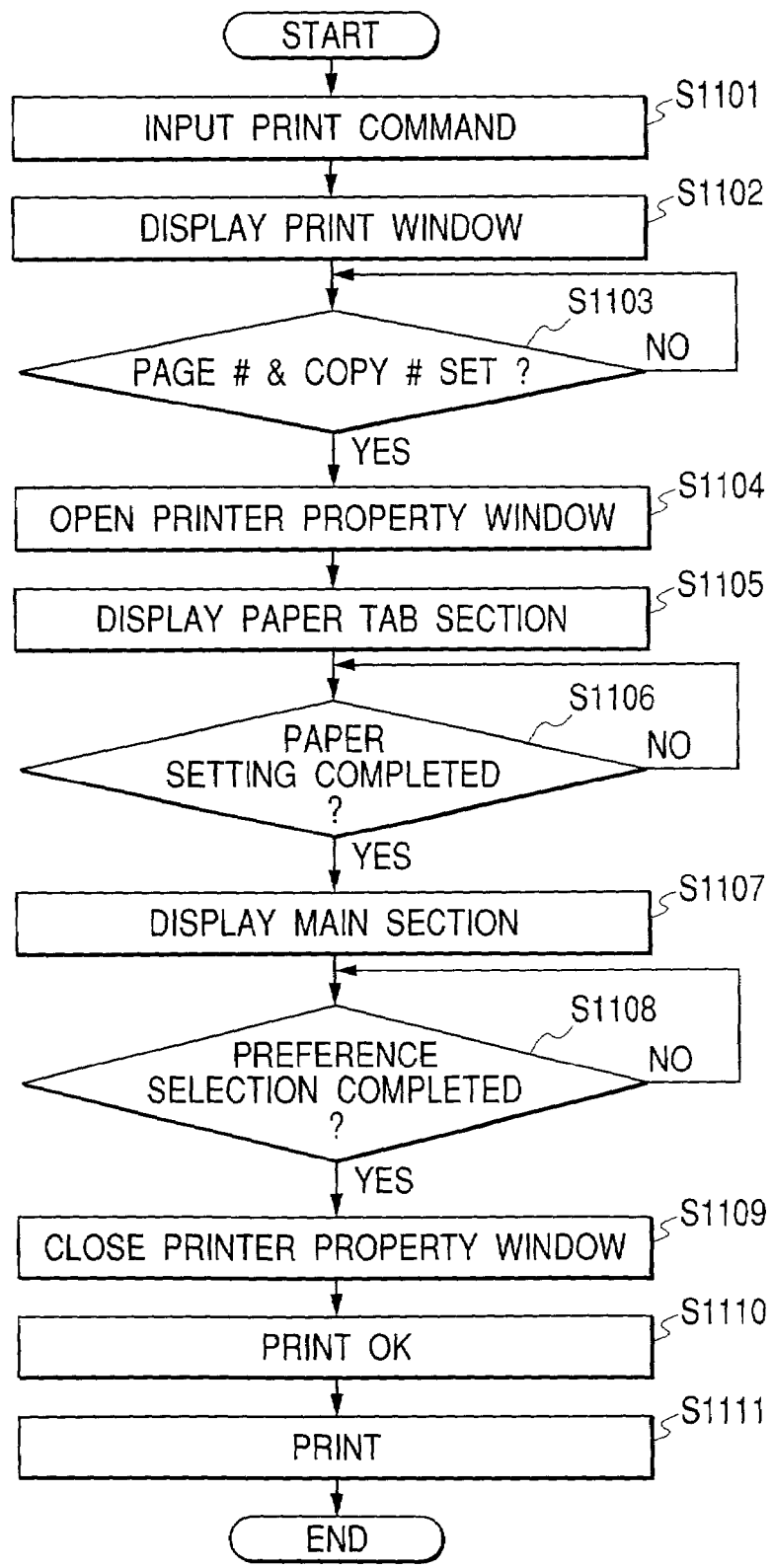
FIG. 11 is a flowchart for explaining a procedure at the time of executing a printing process.

Explanation will now be returned to the flowchart of FIG. 11. The user integrally determines the proper mode from the obtaining situation of the paper, the recording time, and the image quality, sets one of check boxes 1407 to 1409 corresponding to the items 1401 to 1403 in the main section in FIG. 14 to ON, and selects it.

If it is determined that the selection of the preferential items has been finished in S1108, the printer property window is closed in S1109. When a print "OK" button 1204 on the print window in FIG. 12 is pressed in S1110, the printer driver 203 executes the forming process of the print data in S1111.

Figure 17:
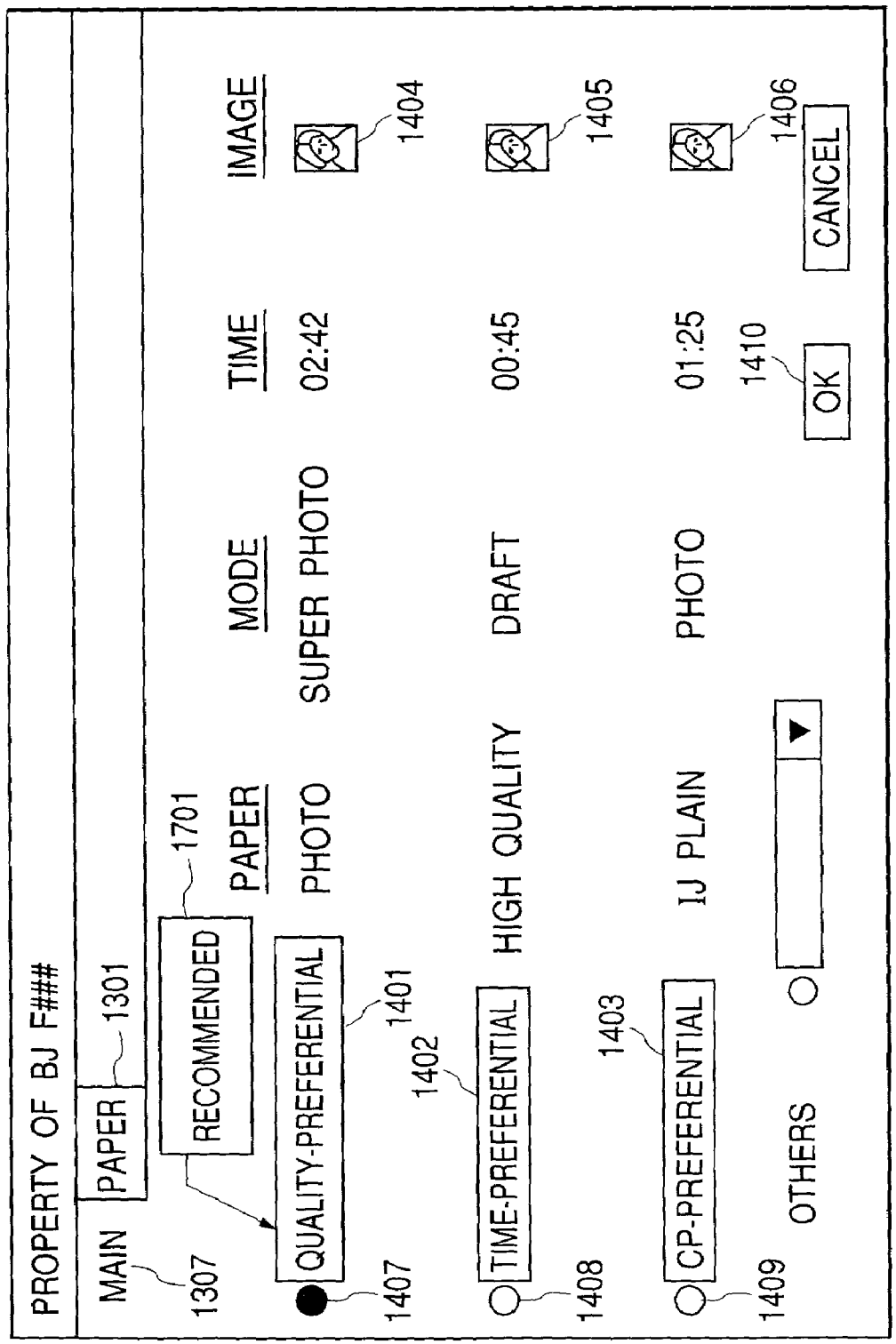
FIG. 17 is a diagram showing an example of a main section on the property window.

The displaying method of the main section in the property window is not limited to the foregoing example but a method whereby an order is added to each combination of the recommended paper and recording mode and they are expressed or a method whereby a few candidates are merely displayed and the user is allowed to select a proper one and express it can be also used. It is not always necessary to display all of the paper type, recording mode, recording time, and image quality confirmation. It is also possible to merely display some of them. Further, as shown in FIG. 17, it is also possible to display by adding a recommended mark 1701 to the recommended items (combination of the paper, recording mode, recording time, and image quality).

(Third Embodiment)

The combination according to the preferential items has been displayed as a list in the second embodiment. In the third embodiment, means which can previously instruct the preferential item is provided and a confirmation window is shown without displaying a plurality of candidates to be selected.

Figure 18:
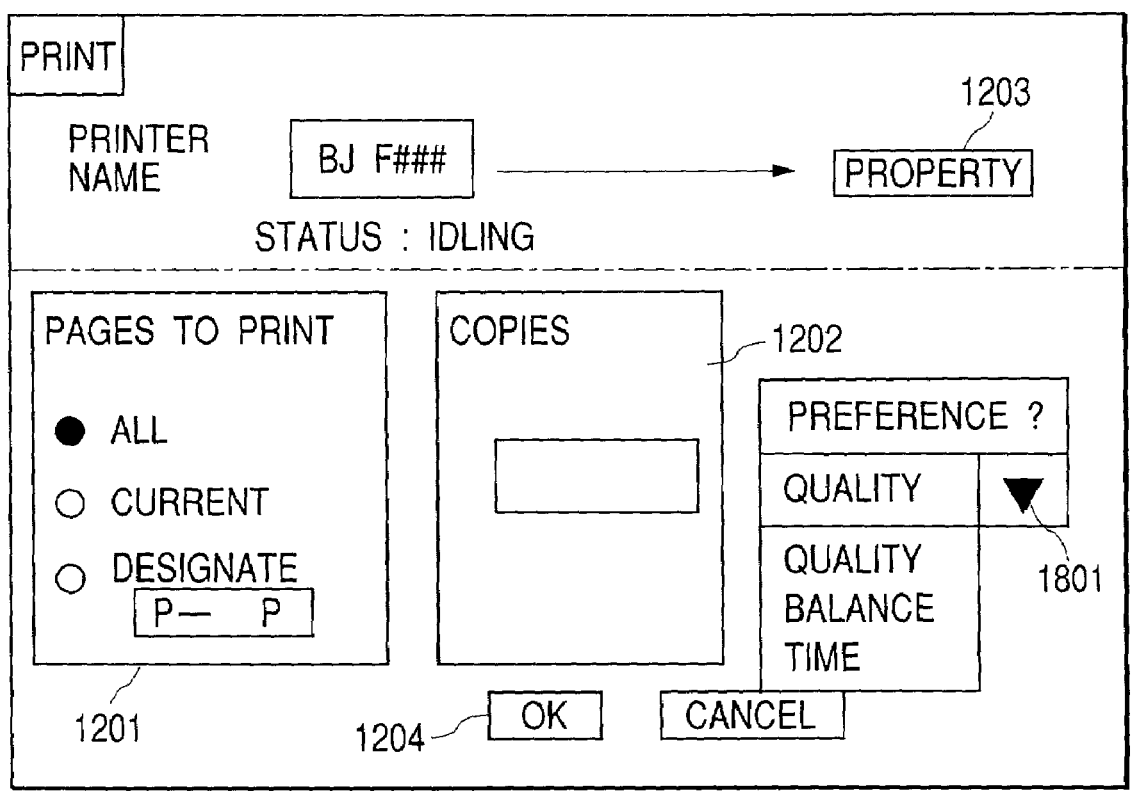
FIG. 18 is a diagram showing an example of the print window.
Figure 19:
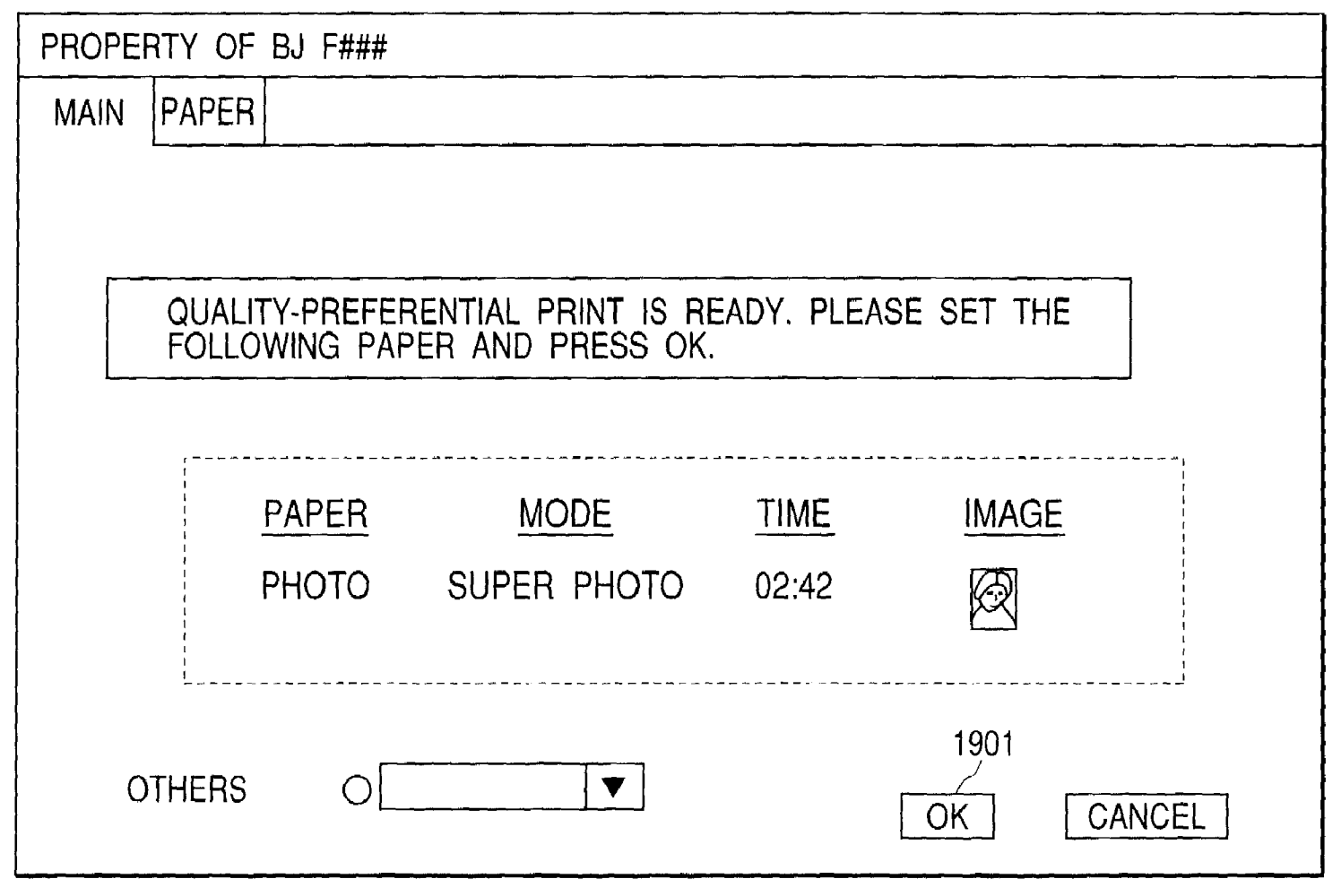

FIG. 18 shows an example of a print window according to the third embodiment. On a pull-down menu 1801 for decision of preferential items, one of "quality" preference, "balance" preference (balance regarding all or a part of the image quality, time, and costs), and recording "time" preference is selected and preset. In this selection, once it is set, the same set contents are maintained until it is changed next. When the "property" button 1203 is pressed after the print pages and the number of copies are inputted, a paper tab section in the property window appears as shown in FIG. 19. In this example, the paper, recording mode, recording time, and the like corresponding to the preferential item instructed on the print window are displayed. After confirming them, the user presses an "OK" button 1901, further presses the "OK" button 1204 on the print window, and executes the print.

In the embodiment, once the preferential item is determined, the paper and the recording mode are automatically determined from the image contents. Therefore, the user can execute the recording according to the purpose in the shortest time. In case of a printer such that only the text print can be performed, since the same setup contents are always maintained, the excellent operability is obtained.

(Fourth Embodiment)

A preferential item select button is provided on the printer 1500 in the fourth embodiment. When, the mode is set to, for example, the quality-preferential print mode on the printer 1500, this information is sent to the host computer 3000 through the interface 21. The printer driver 203 displays the paper, recording mode, recording time, and image for image quality confirmation corresponding to the quality-preferential print mode. The setup contents on the printer 1500 are held and the information is transmitted at a point when power sources of the printer 1500 and host computer 3000 are turned on. Therefore, the recording can be performed in the same recording conditions unless the mode is changed.

(Fifth Embodiment)

A mark for discriminating the media type is previously printed to an area out of a recording range of the recording medium and a reflecting type optical sensor for reading such a mark is provided in a paper tray of the printer 1500, thereby enabling the type of recording medium to be automatically detected. In the fifth embodiment, in addition to the display contents described in all of the foregoing embodiments, the detection information is displayed. Thus, an erroneous selection of the recording medium can be prevented.

Figure 20:
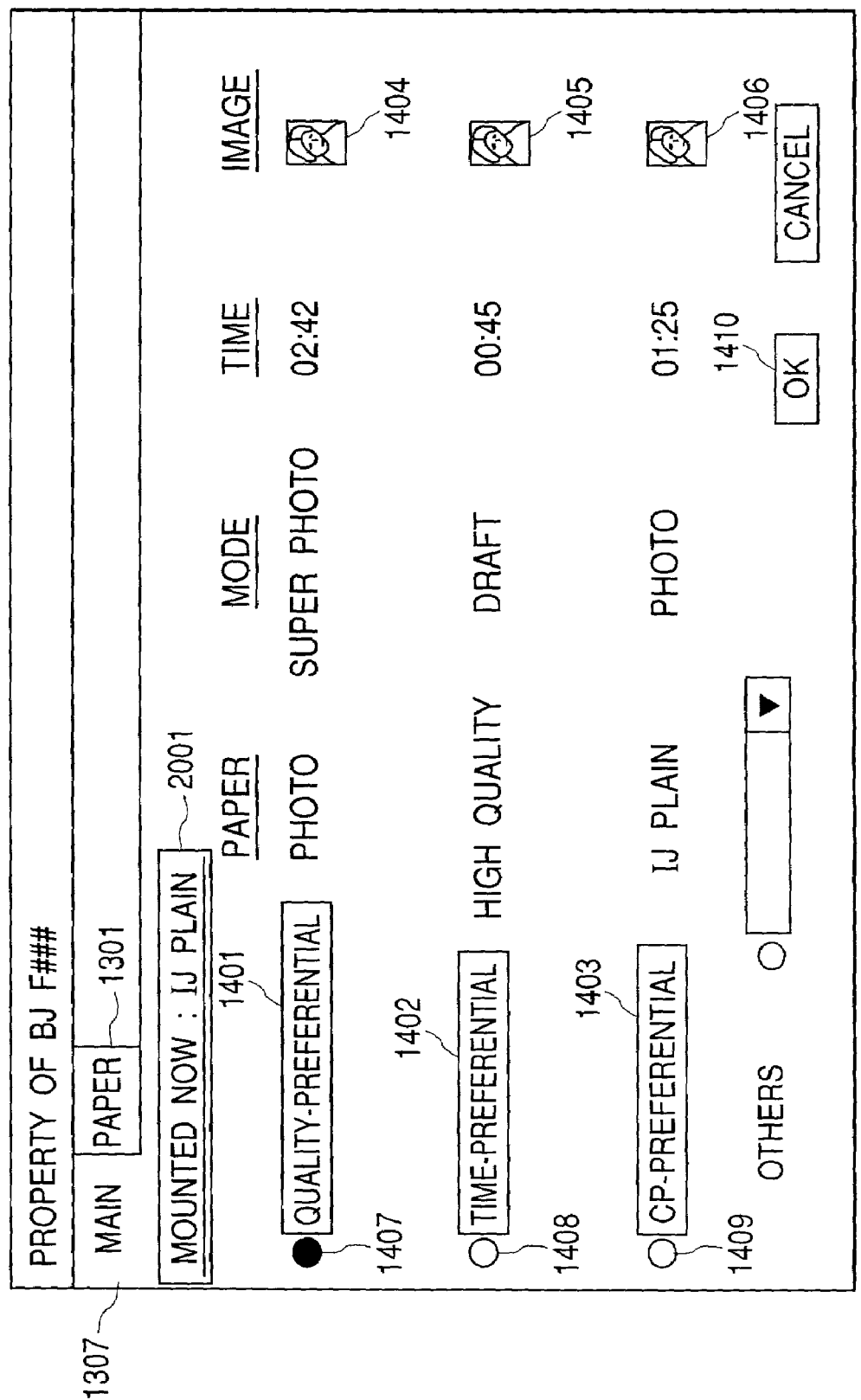
FIG. 20 is a diagram showing an example of a main section on a property window in the fifth embodiment.

FIG. 20 shows a main section on the property window in the fifth embodiment. The mounted papers which were automatically detected as mentioned above are displayed in a mounted paper display area 2001. That is, the detection information of the reflecting type optical sensor (not shown) is sent from the printer 1500 to the printer driver 203 in the host computer 3000 through the interface 21. The driver 203 displays the name of the mounted papers corresponding to the mark for discrimination of the medium type into the area 2001. In the diagram, an IJ plain paper is displayed.

In the embodiment, the papers actually mounted are compared with the papers corresponding to each preferential item and a process such as replacement of the papers or the like is executed and, thereafter, the recording can be performed. Therefore, a deterioration of the image quality or a delay of a recording speed due to an erroneous operation can be prevented. It is also possible to automatically select the preferential items to which the papers matched with the actually mounted papers belong or to add the recommended mark 1701 as described in FIG. 17.

(Other Embodiments)

The invention also incorporates a case where in order to make the various devices operative so as to realize the functions of the embodiments mentioned above, program codes of software to realize the functions of the embodiments mentioned above are supplied to a computer in an apparatus or a system connected to the various devices and the various devices are made operative in accordance with a program stored in the computer (CPU or MPU) of the system or apparatus.

In this case, the program codes themselves of the software realize the functions of the embodiments mentioned above. The program codes themselves and means for supplying the program codes to the computer, for example, a recording medium in which the program codes have been stored construct the present invention. As a recording medium for storing the program codes, for example, it is possible to use a floppy disk, a hard disk, an optical disk, a magnetooptic disk, a CD-ROM, a CD-R, a CD-RW, a DVD-ROM, a DVD-RAM, a magnetic tape, a nonvolatile memory card, an ROM, or the like.

Naturally, the program codes are incorporated in the embodiments of the present invention not only in the case where a computer executes the supplied program codes, so that the functions of the embodiments mentioned above are realized, but also in the case where the program codes function in cooperation with the OS (Operating System), other application software, or the like which is operating in the computer, so that the functions of the embodiments mentioned above are realized.

Further, the invention incorporates a case where the supplied program codes are stored into a memory equipped for a function expansion board of a computer or a function expansion unit connected to a computer and, thereafter, a CPU or the like equipped for the function expansion board or function expansion unit executes a part or all of the actual processes on the basis of instructions of the program codes, and the functions of the embodiments mentioned above are realized by those processes.

The program codes themselves which are installed into a computer in order to realize the functions and processes of the invention by the computer realize the invention. That is, a computer program itself to realize the functions and processes of the invention is also incorporated in Claims of the invention.

As a supplying method of the computer program, the invention is not limited to a case where the computer program is stored into the FD or CD-ROM and it is read out by the computer and stored therein as mentioned above, but it can be also supplied by a method whereby the computer is connected to a homepage of the Internet by using a browser of a client computer and the computer program itself of the invention is downloaded from the homepage or a compressed file including an automatic installing function is downloaded. The functions and processes of the invention can be also realized by a method whereby the program codes constructing the program of the invention are divided into a plurality of files and each file is downloaded from a different homepage. That is, a WWW server for downloading the program file for realizing the functions and processes of the invention by the computer to a plurality of users is also incorporated in Claims of the invention.

The functions and processes of the invention can be also realized by a method whereby the program of the invention is encrypted and stored into a memory medium such as an FD or the like and distributed to the user, key information for decrypting the encryption is downloaded from the homepage through the Internet to the user who satisfied predetermined conditions, and the encrypted program is executed by using the key information and installed to the computer.

The shape and structure of each portion shown in the embodiments are no more than examples upon embodying the invention. The technical scope of the invention should not be limitatively interpreted by them. That is, the invention can be embodied by various forms without departing from the spirit or main feature of the invention.

As many apparently widely different embodiments of the present invention can be made without departing from the spirit and scope thereof, it is to be understood that the invention is not limited to the specific embodiments thereof except as defined in the appended claims.

As described above, according to the embodiments, by informing the user of the print time, the print in the setup in which it takes time for outputting can be preliminarily canceled.

By displaying the print time of every favorite or print purpose, it becomes the reference data in case of printing next and the print in the optimum setup can be performed.

As described above, according to the invention, since the printer driver provides the function for informing the user of the print time that is required for the printing process before starting the printing, the user can previously recognize the time which is required for the printing process.

By estimating the print time every plural print purposes and informing the user of each print time, the user can recognize the time that is required for the printing process every print purpose.

By estimating the print time every plural print environments and informing the user of each print time, the user can recognize the time that is required for the printing process every print environment.

After the print time is informed every print purpose or print environment, an instruction about whether the printing process is executed or not is accepted. Therefore, the user can determine whether the printing process is executed or not in consideration of the print time.

After the print time is informed every print purpose or print environment, an instruction to cancel the printing process is canceled is accepted. Therefore, the user can previously cancel the print in consideration of the print time.

After the print time is informed every plural print purposes or print environments, an instruction about in which print environment the printing process is executed is accepted. Therefore, the user can instruct that the printing process is executed under a desired print purpose or print environment in consideration of the print time of every plural print purposes or print environments.

What is claimed is:

1. An information processing apparatus that serves as a host computer for forming print data which can be interpreted by a printing apparatus, comprising:
   a selection unit which selects one of a plurality of print profiles provided for one printing apparatus stored in a storage unit, each print profile comprising a combination of a plurality of pieces of print setting information;
   a reception unit which receives draw information based on a print document formed by an application in accordance with a printing instruction;
   an estimation unit which estimates, based on the draw information received by said reception unit and the print profile selected by said selection unit, print time for the selected print profile required for a printing process of the received draw information, and which estimates, based on the received draw information and a print profile not selected by said selection unit, a print time for the non-selected print profile required for a printing process of the received draw information;
   a display control unit which displays the print time for the selected print profile and the print time for the non-selected print profile estimated by said estimation unit for the draw information before the print data is formed; and
   a forming control unit which, if execution of the printing process is determined after the plurality of print times are displayed by said display control unit, forms the print data which can be interpreted by the printing apparatus based on the draw information received by said reception unit and the print profile selected by said selection unit and which, if execution of the printing process is canceled after the plurality of print times are displayed by said display control unit, cancels forming of the print data.

2. An apparatus according to claim 1, wherein said estimation unit estimates the print time using obtaining means obtains the draw information including an ID of every object constructing the print document before the execution of the print through an expansion API provided between a printer driver and the application.

3. An apparatus according to claim 1, wherein said print set information is information regarding print quality in said print data.

4. An apparatus according to claim 1, wherein said print set information includes information regarding print quality in said print data and information regarding a print layout.

5. An apparatus according to claim 1, wherein said estimating means estimates the print time required for the printing process of one piece of draw information received by said receiving means for each of the plurality of pieces of print set information obtained by said obtaining means, and further comprising:
   informing means for informing the user of the print times estimated for the plurality of pieces of print set information by said estimating means before said print data is formed by said forming means.

6. An apparatus according to claim 5, wherein said informing means provides said print time and a user interface for promoting an input of an instruction to execute the printing process which requires said print time.

7. An apparatus according to claim 6, wherein the user interface which is informed by said informing means accepts the input of the instruction for canceling the execution of the printing process which requires said print time.

8. An apparatus according to claim 5, further comprising selection means for selecting one of the plurality of pieces of print set information stored in the storage unit for execution of the printing process after said informing means informs the user of the estimated print times.

9. An apparatus according to claim 5, wherein said display control means controls such that the plurality of print times, each required for the printing process of the draw information, respectively corresponding to the plurality of print modes, are displayed simultaneously.

10. An apparatus according to claim 1, further comprising setting means for setting the plurality of pieces of print set information to be obtained by said obtaining means.

11. An apparatus according to claim 1, further comprising transmitting means for transmitting said print data to said printing apparatus through a network.

12. An information processing method of forming print data which can be interpreted by a printing apparatus, comprising:
  a selecting step of selecting one of a plurality of print profiles provided for one printing apparatus stored in a storage unit, each print profile comprising a combination of a plurality of pieces of print setting information;
  a receiving step of receiving draw information based on a print document formed by an application in accordance with a printing instruction;
  an estimating step of estimating, based on the draw information received in said receiving step and the print profile selected in said selecting step, a print time for the selected print profile required for a printing process of the received draw information, and of estimating, based on the received draw information and a print profile not selected in said selecting step, a print time for the non-selected print profile required for a printing process of the received draw information;
  a display control step of displaying the print time for the selected print profile and the print time for the non-selected print profile estimated in said estimating step for the draw information before the print data is formed; and
  a forming control step of forming, if execution of the printing process is determined after the plurality of print times are displayed in said display control step, the print data which can be interpreted by the printing apparatus based on the draw information received in said receiving step and the print profile selected in said selecting step and which, if execution of the printing process is canceled after the plurality of print times are displayed in said display control step, cancels forming of the print data.

13. A computer-readable memory medium which stores an information processing program for an information processing apparatus that serves as a host computer for forming print data which can be interpreted by a printing apparatus, wherein said program comprises:
  a selecting step of selecting one of a plurality of print profiles provided for one printing apparatus stored in a storage unit, each print profile comprising a combination of a plurality of pieces of print setting information;
  a receiving step of receiving draw information based on a print document formed by an application in accordance with a printing instruction;
  an estimating step of estimating, based on the draw information received in said receiving step and the print profile selected in said selecting step, a print time for the selected print profile required for a printing process of the received draw information, and of estimating, based on the received draw information and a print profile not selected in said selecting step, a print time for the non-selected print profile required for a printing process of the received draw information;
  a display control step of displaying the print time for the selected print profile and the print time for the non-selected print profile estimated in said estimating step for the draw information before the print data is formed; and
  a forming control step of forming, if execution of the printing process is determined after the plurality of print times are displayed in said display control step, the print data which can be interpreted by the printing apparatus based on the draw information received in said receiving step and the print profile selected in said selecting step and which, if execution of the printing process is canceled after the plurality of print times are displayed in said display control step, cancels forming of the print data.

14. A computer-executable program stored on a computer-readable memory medium, said program for forming print data which can be interpreted by a printing apparatus, said program comprising:
  a selecting step of selecting one of a plurality of print profiles provided for one printing apparatus stored in a storage unit, each print profile comprising a combination of a plurality of pieces of print setting information;
  a receiving step of receiving draw information based on a print document formed by an application in accordance with a printing instruction;
  an estimating step of estimating, based on the draw information received in said receiving step and the print profile selected in said selecting step, a print time for the selected print profile required for a printing process of the received draw information, and of estimating, based on the received draw information and a print profile not selected in said selecting step, a print time for the non-selected print profile required for a printing process of the received draw information;
  a display control step of displaying the print time for the selected print profile and the print time for the non-selected print profile estimated in said estimating step for the draw information before the print data is formed; and
  a forming control step of forming, if execution of the printing process is determined after the plurality of print times are displayed in said display control step, the print data which can be interpreted by the printing apparatus based on the draw information received in said receiving step and the print profile selected in said selecting step and which, if execution of the printing process is canceled after the plurality of print times are displayed in said display control step, cancels forming of the print data.

15. An information processing apparatus that serves as a host computer for forming print data which can be interpreted by a printing apparatus, comprising:

a reception unit which receives draw information based on a print document formed by an application in accordance with a printing instruction;

an analysis unit which analyzes the draw information received by said reception unit;

an estimation unit which estimates a plurality of print times respectively corresponding to a plurality of print modes, each required for a printing process of the draw information received by said reception unit based on an analysis result obtained by said analysis unit and, the plurality of print modes for one printing apparatus stored in a storage unit, each print mode comprising a combination of a plurality of pieces of print setting information;

a display control unit which displays in correspondence to the plurality of print modes the plurality of print times estimated by said estimation unit for the draw information;

a selection unit which selects one of the plurality of print modes displayed by said display control unit in accordance with an instruction input means via a user interface;

a forming unit which forms the print data based on the one print mode selected by said selection unit and the draw information received by said reception unit; and a transmission unit which transmits the print data formed by said forming unit to the printing apparatus.

16. An apparatus according to claim 15, wherein said display control means allows a button for displaying a preview image for confirming an image quality to be displayed in correspondence to said plurality of print modes.

17. An apparatus according to claim 15, further comprising discriminating means for analyzing the draw information which is obtained by said obtaining means and discriminating a proper print mode from said plurality of print modes, wherein said display control means allows a message for recommending the print mode discriminated by said discriminating means to be displayed.

18. An apparatus according to claim 17, wherein said discriminating means discriminates the proper print mode on the basis of a ratio of color data of the draw information.

19. An information processing method of forming print data which can be interpreted by a printing apparatus, comprising:

a receiving step which receives draw information based on a print document formed by an application in accordance with a printing instruction;

an analyzing step which analyzes the draw information received in said receiving step;

an estimating step of estimating a plurality of print times respectively corresponding to a plurality of print modes, each required for a printing process of the draw information received in said receiving step, based on an analysis result obtained in said analyzing step and the plurality of print modes for one printing apparatus stored in a storage unit, each print mode comprising a combination of a plurality of pieces of print setting information;

a display control step of displaying in correspondence to the plurality of print modes the plurality of print times estimated in said estimating step for the draw information;

a selection step of selecting one of the plurality of print modes displayed in said display control step in accordance with an instruction input via a user interface;

a forming step of forming the print data based on the one print mode selected in said selection step and the draw information received in said receiving step; and a transmitting step of transmitting the print data formed in said forming step to the printing apparatus.

20. A computer-readable memory medium which stores an information processing program for an information processing apparatus that serves as a host computer for forming print data which can be interpreted by a printing apparatus, wherein said program comprises:

a receiving step which receives draw information based on a print document formed by an application in accordance with a printing instruction;

an analyzing step which analyzes the draw information received in said receiving step;

an estimating step of estimating a plurality of print times respectively corresponding to a plurality of print modes, each required for a printing process of the draw information received in said receiving step, based on an analysis result obtained in said analyzing step and the plurality of print modes for one printing apparatus stored in a storage unit, each print mode comprising a combination of a plurality of pieces of print setting information;

a display control step of displaying in correspondence to the plurality of print modes the plurality of print times estimated in said estimating step for the draw information;

a selection step of selecting one of the plurality of print modes displayed in said display control step in accordance with an instruction input via a user interface;

a forming step of forming the print data based on the one print mode selected in said selection step and the draw information received in said receiving step; and a transmitting step of transmitting the print data formed in said forming step to the printing apparatus.

21. A computer-executable program stored on a computer-readable memory medium, the program for forming print data which can be interpreted by a printing apparatus, said program comprising:

a receiving step which receives draw information based on a print document formed by an application in accordance with a printing instruction;

an analyzing step which analyzes the draw information received in said receiving step;

an estimating step of estimating a plurality of print times respectively corresponding to a plurality of print modes, each required for a printing process of the draw information received in said receiving step, based on an analysis result obtained in said analyzing step and the plurality of print modes for one printing apparatus stored in a storage unit, each print mode comprising a combination of a plurality of pieces of print setting information;

a display control step of displaying in correspondence to the plurality of print modes the plurality of print times estimated in said estimating step for the draw information;

a selection step of selecting one of the plurality of print modes displayed in said display control step in accordance with an instruction input via a user interface;

a forming step of forming the print data based on the one print mode selected in said selection step and the draw information received in said receiving step; and a transmitting step of transmitting the print data formed in said forming step to the printing apparatus.

* * * * *

UNITED STATES PATENT AND TRADEMARK OFFICE
CERTIFICATE OF CORRECTION

PATENT NO. : 7,161,696 B2
APPLICATION NO. : 09/916433
DATED : January 9, 2007
INVENTOR(S) : Yamamoto et al.

It is certified that error appears in the above-identified patent and that said Letters Patent is hereby corrected as shown below:

COLUMN 2:
Line 61, "times every" should read -- times for every --;
Line 61, "plural" should read -- set of plural --; and
Line 64, "time every" should read -- time for every --.

COLUMN 3:
Line 40, "every favorite" should be deleted.

COLUMN 4:
Line 39, "enables" should read -- enabling --.

COLUMN 5:
Line 49, "in case" should read -- in the case --; and
Line 55, "in case" should read -- in the case --.

COLUMN 6:
Line 32, "every" should read -- for every --; and
Line 48, "every" should read -- for all --.

COLUMN 7:
Line 6, "every" should read -- for every --;
Line 12, "Every" should read -- for Every --; and
Line 52, "every" should read -- for every --.

COLUMN 8:
Line 4, "every" should read -- for every --;
Line 13, "case" should read -- the case --; and
Line 38, "every" should read -- for every --.

COLUMN 9:
Line 6, "every" should read -- for every --;
Line 15, "every" should read -- for every --;
Line 65, "every" should read -- for every --; and
Line 66, "plural" should read -- set of plural --.

UNITED STATES PATENT AND TRADEMARK OFFICE
CERTIFICATE OF CORRECTION

PATENT NO. : 7,161,696 B2
APPLICATION NO. : 09/916433
DATED : January 9, 2007
INVENTOR(S) : Yamamoto et al.

It is certified that error appears in the above-identified patent and that said Letters Patent is hereby corrected as shown below:

COLUMN 10:
Line 8, "case" should read -- the case --; and
Line 17, "the half." should read -- half. --.

COLUMN 11:
Line 60, "every" should read -- for every --;
Line 60, "preferential" should read -- set of perferential --; and
Line 61, "the system" should read -- a system --.

COLUMN 13:
Line 44, "in case" should read -- In the case --; and
Line 50, "When," should read -- When --.

COLUMN 15:
Line 46, "case" should read -- the case --;
Line 53, "every" should read -- for every set of --;
Line 56, "every" should read -- for every --;
Line 57, "every" should read -- for every set of --;
Line 60, "every" should read -- for every --;
Line 61, "every" should read -- for every --; and
Line 66, "every" should read -- for every set of --.

COLUMN 16:
Line 1, "is canceled" should be deleted;
Line 3, "every" should read -- for every set of --;
Line 8, "every" should read -- for every set of --; and
Line 49, "print" should read -- print instruction --.

UNITED STATES PATENT AND TRADEMARK OFFICE
CERTIFICATE OF CORRECTION

PATENT NO. : 7,161,696 B2 Page 3 of 3
APPLICATION NO. : 09/916433
DATED : January 9, 2007
INVENTOR(S) : Yamamoto et al.

It is certified that error appears in the above-identified patent and that said Letters Patent is hereby corrected as shown below:

COLUMN 19:
Line 9, "unit, and" should read -- unit and --; and
Line 35, "wherein" should read -- ¶ and wherein --.

Signed and Sealed this

Twenty-fifth Day of March, 2008

JON W. DUDAS
*Director of the United States Patent and Trademark Office*